United States Patent
Liu et al.

(10) Patent No.: US 12,414,124 B2
(45) Date of Patent: Sep. 9, 2025

(54) RESOURCE CONFIGURATION METHOD, INFORMATION TRANSMISSION METHOD, AND RELATED DEVICE

(71) Applicant: VIVO MOBILE COMMUNICATION CO.,LTD., Guangdong (CN)

(72) Inventors: Siqi Liu, Guangdong (CN); Zichao Ji, Guangdong (CN); Na Li, Guangdong (CN); Shixiao Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 329 days.

(21) Appl. No.: 17/578,788

(22) Filed: Jan. 19, 2022

(65) Prior Publication Data

US 2022/0141866 A1 May 5, 2022

Related U.S. Application Data

(63) Continuation of application No. PCT/CN2020/102132, filed on Jul. 15, 2020.

(30) Foreign Application Priority Data

Jul. 24, 2019 (CN) .......................... 201910673341.8

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/0012* (2013.01); *H04L 5/0053* (2013.01); *H04W 72/1263* (2013.01); *H04W 92/18* (2013.01)

(58) Field of Classification Search
CPC . H04W 72/23; H04W 72/1263; H04W 92/18; H04W 72/20; H04W 28/0252;
(Continued)

(56) References Cited

U.S. PATENT DOCUMENTS

2015/0319796 A1* 11/2015 Lu .......................... H04W 76/14
 370/330
2017/0041902 A1 2/2017 Sheng
(Continued)

FOREIGN PATENT DOCUMENTS

CN 102412880 A 4/2012
CN 108141847 A 6/2018
(Continued)

OTHER PUBLICATIONS

CATT, "On Mode 1 resource allocation in NR V2X", 3GPP TSG RAN WG1 Meeting #97, R1-1906315, Reno, USA, May 13-17, 2019.
(Continued)

*Primary Examiner* — Obaidul Huq
(74) *Attorney, Agent, or Firm* — Price Heneveld LLP

(57) ABSTRACT

A resource configuration method, an information transmission method, and a related device are provided. The method includes: configuring, for a first terminal, a resource for transmitting target sidelink information, where the target sidelink information includes at least one of first sidelink information and second sidelink information, the first sidelink information is sidelink information corresponding to a sidelink transmission between the first terminal and a second terminal, and the second sidelink information is sidelink information corresponding to a sidelink transmission between the first terminal and the control node.

20 Claims, 5 Drawing Sheets

(51) Int. Cl.
*H04W 72/1263* (2023.01)
*H04W 92/18* (2009.01)

(58) Field of Classification Search
CPC .... H04W 88/04; H04L 5/0012; H04L 5/0053; H04L 5/0044; H04L 5/0094; H04L 5/0055
USPC ........................................ 370/310, 328, 329
See application file for complete search history.

(56) References Cited

U.S. PATENT DOCUMENTS

| | | | | |
|---|---|---|---|---|
| 2018/0092085 | A1 | 3/2018 | Shaheen et al. | |
| 2019/0029020 | A1* | 1/2019 | Zhao | H04W 72/04 |
| 2019/0069200 | A1* | 2/2019 | Zhang | H04W 72/20 |
| 2019/0173612 | A1 | 6/2019 | Kimura et al. | |
| 2019/0230569 | A1* | 7/2019 | Kim | H04W 36/30 |
| 2020/0351937 | A1* | 11/2020 | Lee | H04W 72/20 |
| 2021/0314830 | A1* | 10/2021 | Chang | H04W 36/0009 |
| 2021/0314930 | A1* | 10/2021 | Uchiyama | H04W 4/40 |
| 2021/0321380 | A1 | 10/2021 | Zhao | |
| 2022/0007403 | A1* | 1/2022 | Li | H04W 72/23 |
| 2022/0030602 | A1 | 1/2022 | Yang | |
| 2022/0159620 | A1* | 5/2022 | Yang | H04W 76/14 |

FOREIGN PATENT DOCUMENTS

| | | |
|---|---|---|
| CN | 109644460 A | 4/2019 |
| CN | 109792326 A | 5/2019 |
| CN | 109792594 A | 5/2019 |
| CN | 109891981 A | 6/2019 |
| CN | 111278050 A | 6/2020 |
| JP | 2018029323 A | 2/2018 |
| WO | 2016144574 A1 | 9/2016 |
| WO | 2018173523 A1 | 9/2018 |
| WO | 2019019885 A1 | 1/2019 |

OTHER PUBLICATIONS

Interdigital, Inc., On NR Sidelink Mode 1 Resource Allocation, 3GPP TSG RAN WG1 #97, R1-1907092, May 13-17, 2019, Reno, USA.

Ericsson, "Feature lead summary on Resource allocation for NR sidelink Mode 1", 33GPP TSG-RAN WG1 Meeting #97, R1-1907655, Reno, USA, May 13-17, 2019.

Samsung, "On Uu-based resource allocation and configuration", 3GPP TSG RAN WG1 Ad-Hoc Meeting 1901, R1-1901060, Taipei, Taiwan, Jan. 21-25, 2019.

* cited by examiner

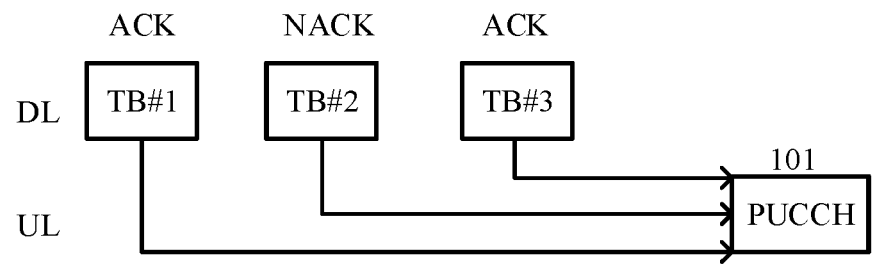
FIG. 1f
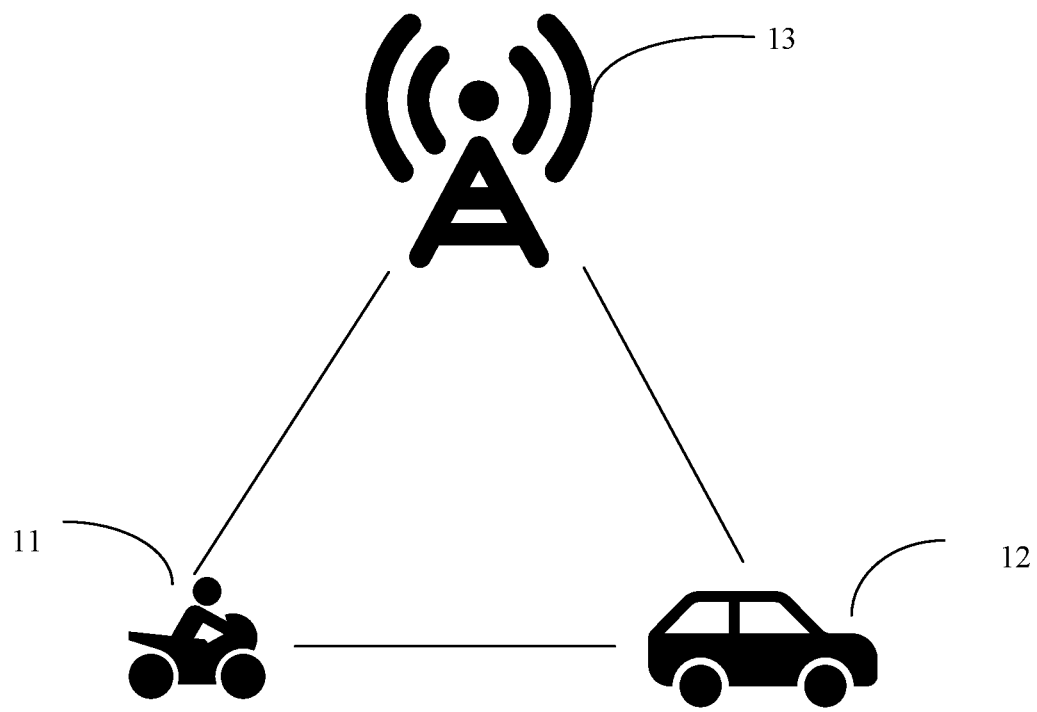
FIG. 2
FIG. 3

RESOURCE CONFIGURATION METHOD, INFORMATION TRANSMISSION METHOD, AND RELATED DEVICE

CROSS-REFERENCE TO RELATED APPLICATIONS

This application is a continuation application of PCT International Application No. PCT/CN2020/102132 filed on Jul. 15, 2020, which claims priority to Chinese Patent Application No. 201910673341.8, filed in China on Jul. 24, 2019, the disclosures of which are incorporated herein by reference in their entireties.

TECHNICAL FIELD

This disclosure relates to the field of communications technologies, and in particular, to a resource configuration method, an information transmission method, and a related device.

BACKGROUND

With development of communications technologies, some mobile communications systems support sidelinks, and data can be directly transmitted between user equipments (UE) (also referred to as terminal devices) based on the sidelinks. However, in the related art, there is no related solution how an uplink resource for transmitting sidelink information to a control node is obtained when user equipment performs a sidelink service based on the PC5 interface.

SUMMARY

Embodiments of this disclosure provide a resource configuration method, an information transmission method, and a related device.

According to a first aspect, an embodiment of this disclosure provides a resource configuration method, applied to a control node and including:
  configuring, for a first terminal, a resource for transmitting target sidelink information, where
  the target sidelink information includes at least one of first sidelink information and second sidelink information, the first sidelink information is sidelink information corresponding to a sidelink transmission between the first terminal and a second terminal, and the second sidelink information is sidelink information corresponding to a sidelink transmission between the first terminal and a control node.

According to a second aspect, an embodiment of this disclosure further provides an information transmission method, applied to a first terminal and including:
  determining a target resource for transmitting target sidelink information; and
  transmitting the target sidelink information on the target resource, where
  the target sidelink information includes at least one of first sidelink information and second sidelink information, the first sidelink information is sidelink information corresponding to a sidelink transmission between the first terminal and a second terminal, and the second sidelink information is sidelink information corresponding to a sidelink transmission between the first terminal and a control node.

According to a third aspect, an embodiment of this disclosure further provides a control node. The control node includes:
  a configuration module, configured to configure, for a first terminal, a resource for transmitting target sidelink information, where
  the target sidelink information includes at least one of first sidelink information and second sidelink information, the first sidelink information is sidelink information corresponding to a sidelink transmission between the first terminal and a second terminal, and the second sidelink information is sidelink information corresponding to a sidelink transmission between the first terminal and a control node.

According to a fourth aspect, an embodiment of this disclosure further provides a terminal. The terminal is a first terminal and includes:
  a determining module, configured to determine a target resource for transmitting target sidelink information; and
  a transmission module, configured to transmit the target sidelink information on the target resource, where
  the target sidelink information includes at least one of first sidelink information and second sidelink information, the first sidelink information is sidelink information corresponding to a sidelink transmission between the first terminal and a second terminal, and the second sidelink information is sidelink information corresponding to a sidelink transmission between the first terminal and a control node.

According to a fifth aspect, an embodiment of this disclosure further provides a control node, including a processor, a memory, and a computer program stored in the memory and capable of running on the processor, where when the computer program is executed by the processor, steps of the resource configuration method according to the first aspect are implemented.

According to a sixth aspect, an embodiment of this disclosure further provides a terminal, including a processor, a memory, and a computer program stored in the memory and capable of running on the processor, where when the computer program is executed by the processor, steps of the information transmission method according to the second aspect are implemented.

According to a seventh aspect, an embodiment of this disclosure further provides a computer-readable storage medium, where the computer-readable storage medium stores a computer program, and when the computer program is executed by a processor, steps of the resource configuration method according to the first aspect are implemented, or steps of the information transmission method according to the second aspect are implemented.

BRIEF DESCRIPTION OF THE DRAWINGS

To describe the technical solutions in the embodiments of this disclosure more clearly, the following briefly described the accompanying drawings required for describing the embodiments of this disclosure. Apparently, the accompanying drawings in the following description show merely some embodiments of this disclosure, and a person of ordinary skill in the art may still derive other drawings from these accompanying drawings.

Figure 4:
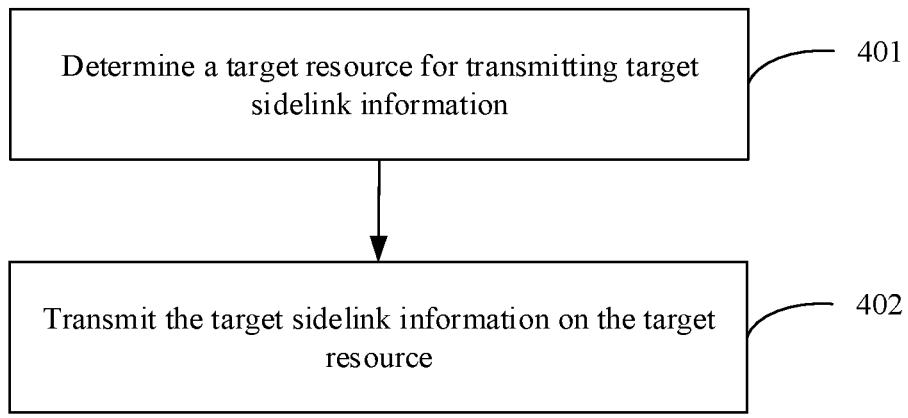
Figure 5:
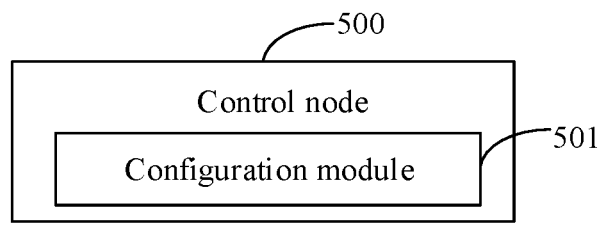
Figure 6:
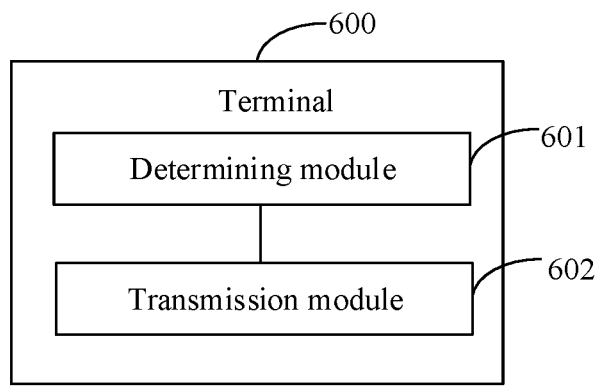
Figure 7:
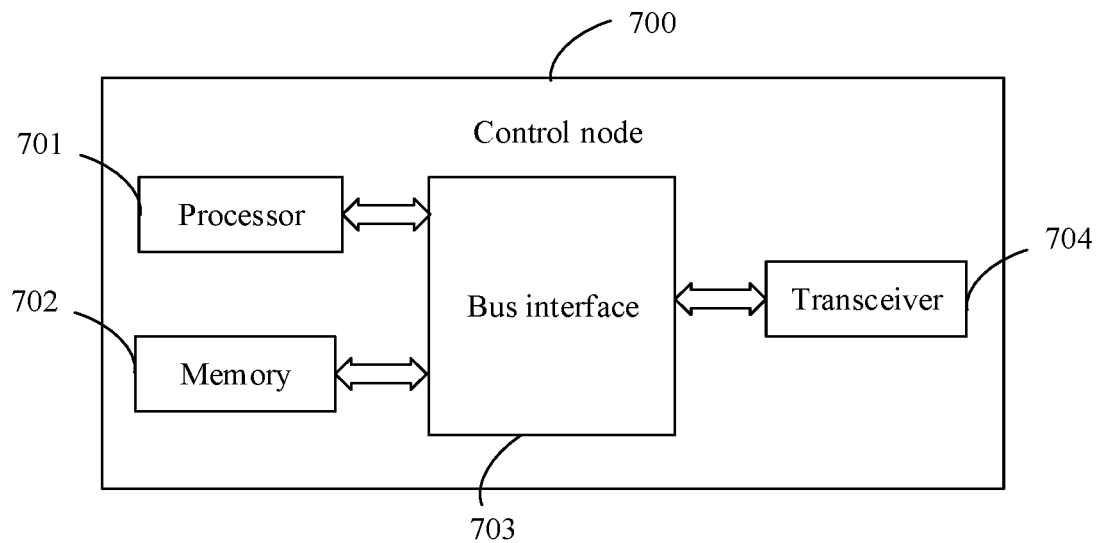
Figure 8:
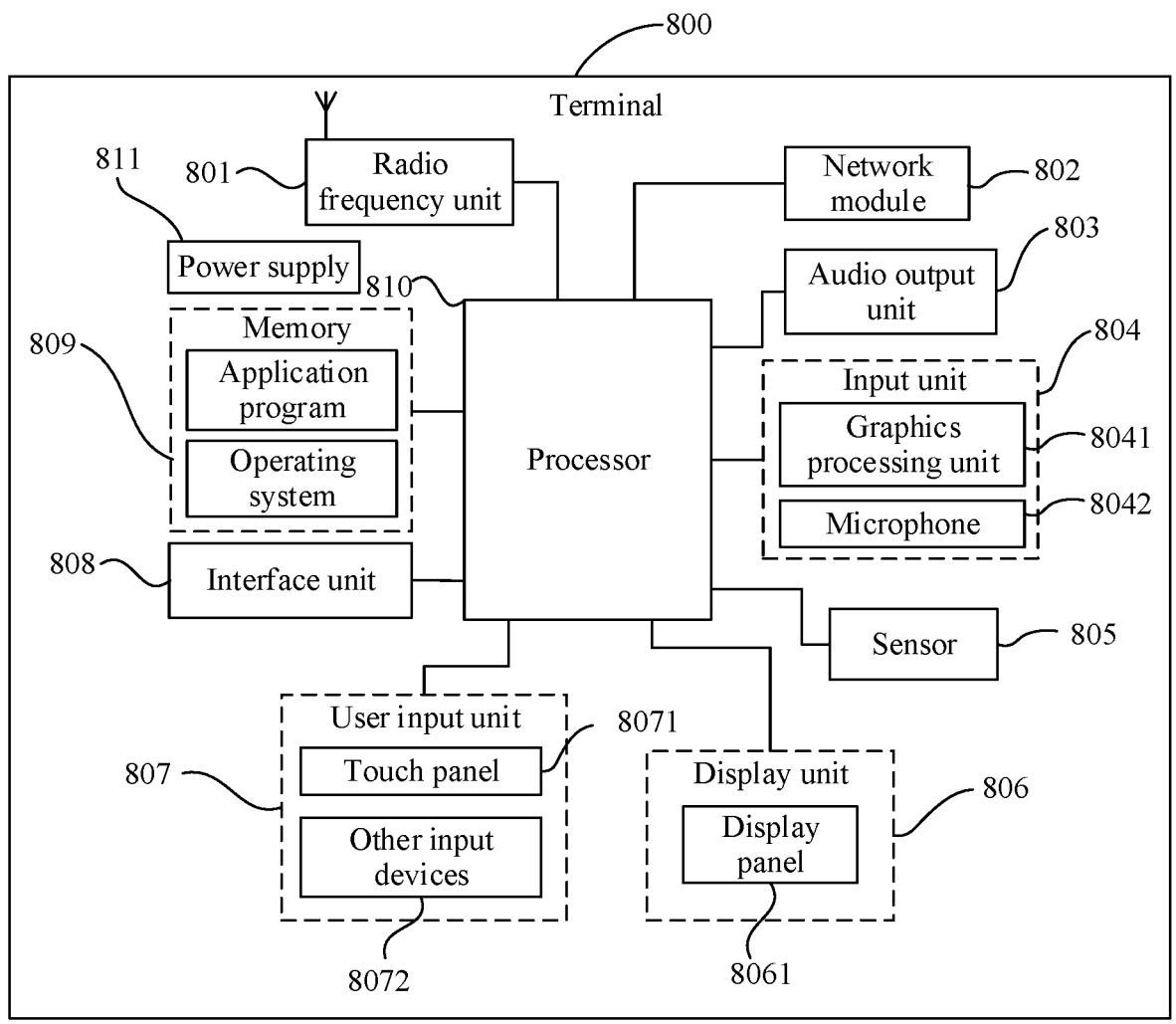

FIG. if is a schematic diagram of UCI multiplexing according to an embodiment of this disclosure;

FIG. 2 is a structural diagram of a network system to which an embodiment of this disclosure may be applied;

FIG. 3 is a flowchart of a resource configuration method according to an embodiment of this disclosure;

FIG. 4 is a flowchart of an information transmission method according to an embodiment of this disclosure;

FIG. 5 is a structural diagram of a control node according to an embodiment of this disclosure;

FIG. 6 is a structural diagram of a terminal according to an embodiment of this disclosure;

FIG. 7 is a structural diagram of a control node according to another embodiment of this disclosure; and FIG. 8 is a structural diagram of a terminal according to another embodiment of this disclosure.

DESCRIPTION OF EMBODIMENTS

The following clearly describes the technical solutions in the embodiments of this disclosure with reference to the accompanying drawings in the embodiments of this disclosure. Apparently, the described embodiments are merely a part rather than all of the embodiments of this disclosure. All other embodiments that a person of ordinary skill in the art obtains based on the embodiments of this disclosure shall fall within the protection scope of this disclosure.

The terms "first", "second", and the like in this specification and claims of this application are used to distinguish between similar objects instead of describing a specific order or sequence. It should be understood that the terms used in this way is interchangeable in appropriate circumstances so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device. In addition, the use of "and/or" in the specification and claims represents presence of at least one of the connected objects. For example, A and/or B and/or C represents the following seven cases: A alone, B alone, C alone, both A and B, both B and C, both A and C, and all of A, B, and C.

Figure 1A:
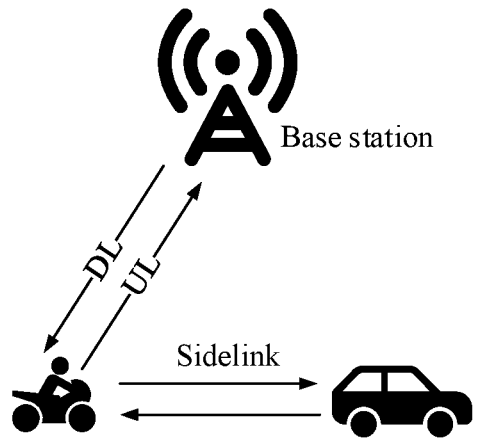
FIG. 1*a* is a schematic diagram of uplink and downlink communication and sidelink communication according to an embodiment of this disclosure.

For ease of understanding, the following describes some content in the embodiments of this disclosure:
Hybrid Automatic Repeat Request (HARQ) Mechanism:

Communication between a control node and UE (which may also be referred to as a terminal device) through a Uu interface by using an uplink and a downlink. Communication between UEs is performed through a PC5 interface by using a sidelink (Sidelink, which may also be referred to as a direct link, a secondary link, a side link, or a sidelink, or the like), as shown in FIG. 1a.

Figure 1B:
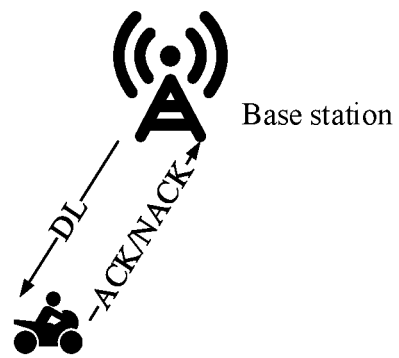
FIG. 1b is a schematic diagram of HARQ-ACK feedback based on an uplink according to an embodiment of this disclosure.

In new radio (NR), for the transmission of a downlink data packet, UE can feed back HARQ-ACK information (NACK or ACK) on a physical uplink control channel (PUCCH) or a physical uplink shared channel (PUSCH) based on a receiving and decoding status of the UE, to notify the control node whether the transmission of the downlink data packet is successful, as shown in FIG. 1b, thereby helping the control node determine whether retransmission is required. The mechanism can effectively improve reliability and resource utilization of the downlink data transmission.

On a sidelink, the UE sends sidelink control information (SCI) through a physical sidelink control channel (PSCCH), and schedules the transmission of a physical sidelink shared channel (PSSCH) to send sidelink data. To improve reliability and resource utilization of the data transmission on the sidelink, a HARQ feedback mechanism is also introduced in the NR sidelink technology. After receiving the sidelink data, the receiving UE on the sidelink can feed back sidelink HARQ-ACK information to indicate whether the sidelink transmission succeeds or fails. The HARQ ACK is sent through a physical sidelink feedback channel (PSFCH).

Figure 1C:
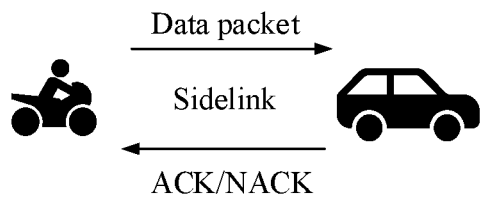
FIG. 1c is a schematic diagram of HARQ-ACK feedback based on a sidelink according to an embodiment of this disclosure.

However, different from the HARQ feedback mechanism for the downlink data packet on the NR Uu interface, the sidelink transmission may not be performed between the control node and the UE, but is performed on the sidelink between UEs, as shown in FIG. 1c. Therefore, the control node cannot directly know whether the transmission of the sidelink data packet is successful, and the UE needs to send the sidelink HARQ-ACK information to the control node, so that the control node can further determine whether the sidelink transmission is successful, and finally determine whether the sending UE needs to be scheduled subsequently to perform retransmission on the sidelink. The UE that reports sidelink information may be the sending UE or the receiving UE. The sending UE or the receiving UE is the UE that sends or receives the sidelink transmission corresponding to the sidelink information. It should be noted that sidelink UE may be the sending or receiving UE. For example, the UE sends sidelink data at a moment a1, and receives sidelink data from other UE at a moment a2.

Figure 1D:
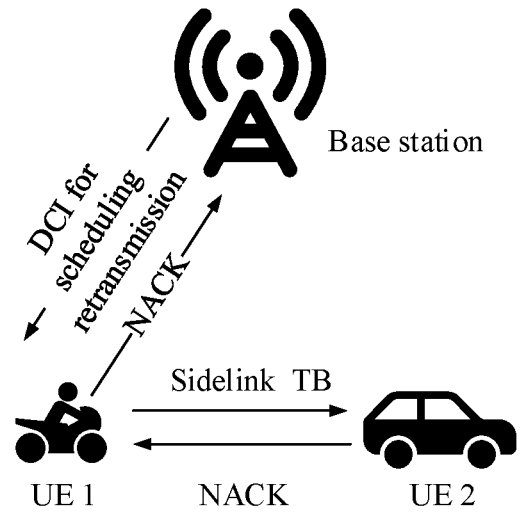
FIG. 1d is a schematic diagram of HARQ-ACK reporting by sending UE according to an embodiment of this disclosure.

An example in which the sending UE reports the sidelink HARQ-ACK information to the control node may be shown in FIG. 1d. The control node schedules UE 1 to send a transport block (TB) to UE 2 on a sidelink. The UE 2 receives the TB but cannot successfully decode the transport block, and therefore feeds back a NACK on the PSFCH. The UE 1 maps the sidelink NACK to a Uu NACK and sends the Uu NACK on a target resource to the control node. After receiving the NACK, the control node knows that the transmission of the TB fails, and therefore sends a piece of scheduling signaling to schedule the UE 1 to retransmit the TB on the sidelink.

Figure 1E:
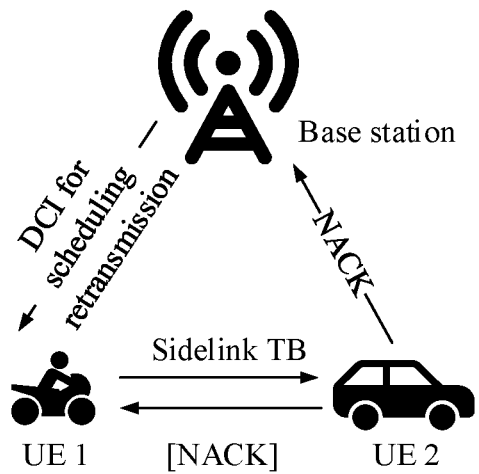
FIG. 1e is a schematic diagram of HARQ-ACK reporting by receiving UE according to an embodiment of this disclosure.

An example in which the receiving UE reports the sidelink HARQ-ACK information to the control node may be shown in FIG. 1e. After the receiving UE on the sidelink determines, through decoding, the sidelink HARQ-ACK information based on the received sidelink transmission, if there is a Uu connection between the receiving UE on the sidelink and the control node and a corresponding target resource is allocated, the sidelink HARQ-ACK information can be directly sent on the target resource to the control node, and may not need to be sent to the sending UE through the PSFCH in this case. In FIG. 1e, square brackets are added to the NACK transmitted by the UE 2 to the UE 1, to indicate that this step may or may not be present.

Resource Allocation Mode and Control Node on the Sidelink:

There are two resource allocation modes on the sidelink: a scheduled resource allocation mode and an autonomous resource selection mode. In the former mode, a resource is allocated to each UE under control of the control node. In the latter mode, the UE autonomously selects a resource. For some UEs, the two resource allocation modes may also be performed at the same time.

On the sidelink, the control node may be a base station, an integrated access backhaul (IAB) node, user equipment, a relay device (Relay), a road side unit (RSU), or the like, or other network facilities similar to an RSU or an IAB. In addition, some control nodes can support both the sidelink and a Uu link.

Uplink Control Information (UCI):

In new radio release 15 (that is, R15 NR), uplink control information fed back by the UE is collectively referred to as UCI. An important part of the UCI is HARQ-ACK information. In addition, the UCI may further include a channel state information (CSI) report, a scheduling request (Scheduling, SR), and the like.

The UCI can be transmitted on a PUCCH resource or a PUSCH resource. The PUCCH resource can support five formats, and different formats have different features. A PUCCH format 0 carries 1-bit UCI or 2-bit UCI in a form of a sequence, occupies one or two symbols in time domain, and occupies one resource block (RB) in frequency domain.

Sidelink Information:

The HARQ-ACK information transmitted on the sidelink can be transmitted on the PSFCH channel, and the CSI transmitted on the sidelink can be transmitted on the PSSCH. The PSFCH currently supports the sequence based on the PUCCH format 0 (but a quantity of time-frequency domain resources that may be occupied is different, or other new features are introduced, or other new formats are introduced). Therefore, the PSFCH may be referred to as a PSFCH format 0. It should be noted that the name of the PSFCH is not limited to the PSFCH format 0, and may also be other names based on actual conditions.

It should be noted that, for a purpose of distinguishing, HARQ-ACK information for uplink information transmitted on the uplink may be referred to as Uu HARQ-ACK information, and HARQ-ACK information transmitted on the sidelink may be referred to as sidelink HARQ-ACK information.

UCI Multiplexing in NR:

In NR, if no codeblock group (CBG) transmission is configured, HARQ-ACK information corresponding to one TB is one bit. If the bit is 1, it represents an ACK, or if the bit is 0, it represents a NACK. If the control node sends a plurality of TBs, and the control node instructs the UE to send HARQ-ACK information corresponding to the TBs to the control node on a same resource, the UE can multiplex the HARQ-ACK information for the TBs in a manner (such as a codebook) specified by a protocol into a piece of new HARQ-ACK information (for example, a bitmap (Bitmap)), and report the new HARQ-ACK information to the control node.

For example, as shown in FIG. 1f, the control node sends three TBs, where a TB #1 and a TB #3 are successfully decoded by the UE, and a TB #2 fails to be decoded. In this case, values of HARQ-ACK information bits corresponding to the three TBs are 1, 1, and 0 respectively, which represent an ACK, an ACK, and a NACK respectively. In addition, the control node instructs the UE to send the HARQ-ACK information bits corresponding to the three TBs on the same PUCCH. Then the UE multiplexes the three HARQ-ACK information bits into one bitmap 101 and sends the bitmap 101 to the control node.

Configured Grant:

To meet requirements of low-latency or periodic services, NR supports uplink transmission of two types of uplink semi-persistent scheduling grants (Configured UL Grant): type 1 and type 2.

Configured UL grant type 1: A configured UL grant type 1 resource may be semi-statically configured by using radio resource control (RRC) signaling. After receiving the configuration, the user equipment can perform transmission on the configuration based on service arrival and configuration conditions of the user equipment, and no downlink control information (DCI) is required for dynamic scheduling.

Configured UL grant type 2: A configured UL grant type 2 resource may be semi-statically configured by using RRC signaling, and the user equipment cannot directly use the configuration after receiving the configuration. The user equipment can use the granted resource based on activation DCI only after the control node further activates the configuration by using DCI. The control node may further deactivate the configuration by using DCI, and the user equipment receiving deactivation DCI stops using the granted resource.

A configured UL grant usually corresponds to periodic resources that can be used for the UE to send signals, and each period includes a plurality of transmission occasions. Compared with conventional dynamic scheduling (that is, Dynamic Grant), the configured UL grant can reduce signaling overheads and interaction procedures, and ensure low latency requirements.

For the sidelink, a concept similar to the configured grant is introduced. Two types of configured sidelink grants may be supported.

First type: The control node configures sidelink resources without sending additional signaling for activation and/or deactivation. Configured user equipment can use the resources based on an incoming packet status. The name of the resource configuration may be, but is not limited to, a configured sidelink grant type 1.

Second type: The control node configures a sidelink resource by using signaling, and needs to send additional signaling to activate and/or deactivate the resource. The name of the resource configuration may be, but is not limited to, a configured sidelink grant type 2.

It should be noted that the control node may configure a plurality of configured sidelink grants for the user equipment.

An embodiment of this disclosure provides an information transmission method. FIG. 2 is a structural diagram of a network system to which an embodiment of this disclosure may be applied. As shown in FIG. 2, the network system includes a first terminal device 11, a second terminal device 12, and a control node 13. Both the first terminal device 11 and the second terminal device 12 may be user-side devices such as mobile phones, tablet personal computers, laptop computers, personal digital assistants (PDA), mobile Internet devices (MID), wearable devices, or vehicle-mounted terminals. It should be noted that specific types of the first terminal device 11 and the second terminal device 12 are not limited in this embodiment of this disclosure. The control node 13 may be a base station, such as a macro station, an LTE eNB, a 5G NR NB, or a gNB; or the control node 13 may be a small station, such as a low power node (LPN) pico station or a femto station; or the control node 13 may be an access point (AP); or the control node 13 may be an IAB, user equipment, a relay device, an RSU, or the like. Alternatively, the base station may be a centralized unit (CU) and a network node including a plurality of TRPs managed and controlled by the CU. It should be noted that a specific type of the control node 13 is not limited in this embodiment of this disclosure.

It should be noted that the control node 13 may support scheduling sidelink transmission through a sidelink link or support scheduling sidelink transmission through a Uu link, or may support scheduling sidelink transmission through a sidelink and a Uu link at the same time.

It should be noted that the transmission in this embodiment of this disclosure may include sending or receiving.

An embodiment of this disclosure provides a resource configuration method, applied to a control node. FIG. 3 is a flowchart of a resource configuration method according to an embodiment of this disclosure. As shown in FIG. 3, the method includes the following steps.

Step 301: Configure, for a first terminal, a resource for transmitting target sidelink information.

The target sidelink information includes at least one of first sidelink information and second sidelink information, the first sidelink information is sidelink information corresponding to a sidelink transmission between the first terminal and a second terminal, and the second sidelink information is sidelink information corresponding to a sidelink transmission between the first terminal and a control node.

In this embodiment of this disclosure, the sidelink information may include at least one of HARQ-ACK information, CSI, an SR, and the like corresponding to the sidelink transmission.

Optionally, in a case in which the target sidelink information is transmitted through an uplink, the resource for transmitting the target sidelink information may include at least one of a PUCCH resource and a PUSCH resource; or in a case in which the target sidelink information is transmitted through a sidelink, the resource for transmitting the target sidelink information may include at least one of a PSFCH resource and a PSSCH resource.

It should be noted that when the control node is a 4th-Generation (4G) base station or a long term evolution (LTE) base station, the control node may schedule an NR sidelink or an LTE sidelink. When the control node schedules the NR sidelink, a resource for transmitting a codebook is an LTE PUCCH resource or a PUSCH resource. In a case in which the control node is the 4G base station or the LTE base station and the NR sidelink is scheduled, a configured sidelink grant type 1 may be configured for LTE sidelink UE. In this case, a resource for transmitting target sidelink information corresponding to the configured sidelink grant may be a PUCCH or PUSCH in LTE.

In a case in which the control node is a 5th-Generation (5G) base station or a base station of a later version, the control node may schedule an NR sidelink or an LTE sidelink. In the case in which the control node is the 5G base station or the base station of the later version and the LTE sidelink is scheduled, a configured sidelink grant type 2 may be configured for LTE sidelink UE, and DCI may be used to perform activation and deactivation. In a case in which the NR sidelink is scheduled, a configured sidelink grant type 1 and/or a configured sidelink grant type 2 may be configured for NR sidelink UE. In this case, a resource for transmitting target sidelink information corresponding to the configured sidelink grant type may be a PUCCH or PUSCH in NR.

It should be noted that, in a case in which the target sidelink information is transmitted through the uplink, if it is determined that the first sidelink information and uplink information are multiplexed and transmitted, the resource for transmitting the target sidelink information can be used for multiplexing and transmitting the first sidelink information and the uplink information.

Optionally, that the control node configures the resource for transmitting the target sidelink information for the first terminal may include: configuring, for the first terminal by using higher layer signaling (for example, at least one of RRC signaling, a system information block (SIB), or other higher layer signaling), the resource for transmitting the target sidelink information, and/or indicating, to the first terminal by using scheduling signaling (for example, DCI signaling or sidelink control information (SCI) signaling), the resource for transmitting the target sidelink information. In this way, the first terminal can transmit the target sidelink information based on the resource configured by the control node for transmitting the target sidelink information.

It should be noted that, that the control node configures the resource for transmitting the target sidelink information for the first terminal may be explicitly configuring, for the first terminal, the resource for transmitting the target sidelink information, or may be implicitly configuring, for the first terminal, the resource for transmitting the target sidelink information.

It should be noted that the first terminal may be a sending terminal or a receiving terminal.

In this embodiment of this disclosure, the resource for transmitting the target sidelink information is configured for the first terminal, where the target sidelink information includes at least one of the first sidelink information and the second sidelink information, the first sidelink information is the sidelink information corresponding to the sidelink transmission between the first terminal and the second terminal, and the second sidelink information is the sidelink information corresponding to the sidelink transmission between the first terminal and the control node. In this way, a manner of obtaining an uplink resource for transmitting sidelink information to the control node when user equipment performs a sidelink service based on a PC5 interface is provided, and further, efficiency of obtaining the resource for transmitting the target sidelink information can be improved.

Optionally, the configuring, for a first terminal, a resource for transmitting target sidelink information includes:
sending resource configuration information to the first terminal, where
the resource configuration information is used to indicate the resource for transmitting the target sidelink information.

In this embodiment of this disclosure, the control node may send the resource configuration information to the first terminal by using higher layer signaling or scheduling signaling, where the resource configuration information may indicate the resource for transmitting the target sidelink information.

Optionally, the resource configuration information may include at least one of the following: resource information, offset information, period information, and association information.

Optionally, the resource information may include at least one of the following: at least one resource set identifier, at least one resource identifier, a quantity of bits carriable by the resource, a resource format, a frequency hopping mode, an occupied time domain resource, an occupied frequency domain resource, a time domain position, a frequency domain position, a quantity of occupied resources, a sequence, a spreading code, a cyclic shift, a start point of a time window, a period of a time window, and duration of a time window.

In this embodiment, the quantity of occupied resources may be, for example, a total quantity of occupied resource blocks (RB) or a total quantity of occupied resource elements (RE). The cyclic shift may be, for example, an initial cyclic shift $m_0$ or a cyclic shift magnitude $m_{cs}$.

Optionally, the period information may include at least one of the following:
- a period of a resource set for transmitting the target sidelink information;
- a period of the resource for transmitting the target sidelink information;
- a ratio of a period of a resource set for transmitting the target sidelink information to a period of a configured sidelink grant;
- a ratio of a period of the resource for transmitting the target sidelink information to a period of a configured sidelink grant;
- a ratio of a period of a resource set for transmitting the target sidelink information to a period of a first resource; and
- a ratio of a period of the resource for transmitting the target sidelink information to a period of a first resource, where
- the first resource is a feedback resource for obtaining the target sidelink information.

In this embodiment, the first resource may include a PSFCH resource or a PSSCH resource. For example, if UE #1 sends a sidelink transmission to UE #2 and UE #3, and receives, on a PSFCH resource #2 and a PSFCH resource #3, HARQ-ACK information about the data, the PSFCH resource #2 and the PSFCH resource #3 belong to the first resource.

In an actual application, because a ratio α of the period of the resource and/or the resource set for transmitting the target sidelink information to the period of the configured sidelink grant is configured, the UE can determine, by using α and the period of the configured sidelink grant, the period of the resource and/or the resource set for transmitting the target sidelink information. Because a ratio β of the period of the resource and/or the resource set for transmitting the target sidelink information to the period of the first resource is configured, the UE can determine, by using β and the period of the first resource, the period of the resource and/or the resource set for transmitting the target sidelink information.

Optionally, the association information may include at least one of the following:
- an association relationship between the resource for transmitting the target sidelink information and a second resource, where the second resource is a feedback resource for obtaining the target sidelink information;
- an association relationship between the resource for transmitting the target sidelink information and a sidelink transmission;
- an association relationship between the resource for transmitting the target sidelink information and a sending terminal; and
- an association relationship between the resource for transmitting the target sidelink information and a receiving terminal.

In this embodiment, the association relationship between the resource for transmitting the target sidelink information and the second resource may include at least one of the ratio of the resource for transmitting the target sidelink information and the second resource, an association relationship between an identifier of the resource for transmitting the target sidelink information and an identifier of the second resource, and the like.

The association relationship between the resource for transmitting the target sidelink information and the sidelink transmission may include at least one of a ratio of the resource for transmitting the target sidelink information to the sidelink transmission, and the like.

The association relationship between the resource for transmitting the target sidelink information and the sending terminal may include at least one of a ratio of the resource for transmitting the target sidelink information to the sending terminal, an association relationship between an identifier of the resource for transmitting the target sidelink information and an identifier of the sending terminal, and the like.

The association relationship between the resource for transmitting the target sidelink information and the receiving terminal may include at least one of a ratio of the resource for transmitting the target sidelink information to the receiving terminal, an association relationship between an identifier of the resource for transmitting the target sidelink information and an identifier of the receiving terminal, and the like.

Optionally, the association relationship between the resource for transmitting the target sidelink information and the receiving terminal may include:
- an association relationship between an identifier of the resource for transmitting the target sidelink information and an identifier of the receiving terminal.

In this embodiment, a terminal identifier (such as a receiving terminal identifier) may be an ID assigned by the control node to the terminal, a terminal ID predefined by a protocol, a terminal ID preconfigured by a manufacturer, an ID generated by the terminal based on higher layer information (such as an ID of an application layer, an ID of an IP layer, or an ID of a MAC layer), an ID generated by the terminal based on some modes or rules that are configured by the control node or prescribed by a protocol or preconfigured, or a unique identifier associated with the terminal.

Optionally, the association relationship may include at least one of the following:
- a ratio of the resource for transmitting the target sidelink information to a third resource, where the third resource is a feedback resource for obtaining the target sidelink information;
- a ratio of the resource for transmitting the target sidelink information to a resource for a sidelink transmission;
- a ratio of the resource for transmitting the target sidelink information to a sending terminal; and
- a ratio of the resource for transmitting the target sidelink information to a receiving terminal.

In this embodiment, the ratio may include, but is not limited to, at least one of a quantity ratio, a frequency domain density ratio, a time domain symbol ratio, and the like. The quantity ratio may be that the resource for transmitting the target sidelink information corresponds to A sidelink transmissions, the frequency domain density ratio may be that the resource for transmitting the target sidelink information corresponds to the third resource whose FDM quantity is B, and the time domain symbol ratio may be that the resource for transmitting the target sidelink information corresponds to a sidelink transmission occupying C symbols, where A, B, and C are all positive integers.

Optionally, the offset information may include an offset value between a reference point and the resource for transmitting the target sidelink information. It should be noted that the offset information may include one or more different offsets.

Optionally, the reference point may include at least one of the following: a system frame, a direct frame, and activation signaling of a configured sidelink grant type 2 corresponding to the target sidelink information, deactivation signaling of a configured sidelink grant type 2 corresponding to the target sidelink information, a configuration time of a configured sidelink grant type 1 corresponding to the target sidelink information, a configured sidelink grant corresponding to the target sidelink information, a PSFCH corresponding to the target sidelink information, a sidelink transmission corresponding to the target sidelink information, scheduling signaling, and the like, for example, a system frame number 0 (SFN 0), a direct frame number 0 (DFN 0), and a time of transmitting scheduling signaling.

In this embodiment, the offset value between the reference point and the resource for transmitting the target sidelink information is configured, so that the first terminal can determine, based on the reference point and the offset, the resource for transmitting the target sidelink information.

Optionally, resources configured for sidelink information corresponding to different sidelink transmission types may be different.

In this embodiment, the different sidelink transmission types may be understood as sidelink transmissions corresponding to different scheduling, for example, a sidelink transmission corresponding to dynamic scheduling or a sidelink transmission corresponding to a configured sidelink grant; or may be understood as sidelink transmissions corresponding to different configured grant types for example, a sidelink transmission corresponding to a configured grant type 1 or a sidelink transmission corresponding to a configured grant type 2; or may be understood as sidelink transmissions corresponding to different configured grant identifiers (Configured Grant ID).

Optionally, in this embodiment, different resources may be configured for the sidelink information corresponding to the sidelink transmission corresponding to the dynamic scheduling and the sidelink information corresponding to the sidelink transmission corresponding to the configured sidelink grant respectively; or different resources may be configured for the sidelink information corresponding to the sidelink transmission corresponding the configured grant type 1 and the sidelink information corresponding to the sidelink transmission corresponding to the configured grant type 2 respectively; or different resources may be configured for the sidelink information corresponding to the sidelink transmissions corresponding to different configured grant IDs respectively.

Because different resources are configured for sidelink information corresponding to different sidelink transmission types in this embodiment of this disclosure, based on resource configuration flexibility, resource utilization can be improved, and resource waste can be reduced.

Optionally, resources configured for sidelink information corresponding to different sidelink transmission types may be the same.

Optionally, among configured resource sets, there are at least two resource sets corresponding to different transmission bit quantities or different transmission bit quantity ranges;

and/or among configured resources, there are at least two resources corresponding to different transmission bit quantities or different transmission bit quantity ranges.

In this embodiment, the control node may configure at least two resource sets corresponding to different transmission bit quantities or different transmission bit quantity ranges, and/or may configure at least two resources corresponding to different transmission bit quantities or different transmission bit quantity ranges. Because configured different resource sets and/or different resources have different transmission capabilities, the terminal can select, based on the target sidelink information that needs to be fed back, an appropriate resource to transmit the target sidelink information.

For example, two resource sets can be configured for one configured sidelink grant: a set 1 and a set 2, where a quantity of information bits carriable by all resources in the set 1 is within an interval 1, and a quantity of information bits carriable by all resources in the set 2 is within an interval 2. In this way, when the UE needs to feed back sidelink information for the sidelink transmission on the configured sidelink grant, a corresponding set can be selected based on a size of the sidelink information. For example, if the quantity of information bits of the sidelink information that the UE needs to feed back for the sidelink transmission on the configured sidelink grant is within the interval 1, the set 1 is selected for reporting.

Further, if the sidelink information is multiplexed with sidelink information of another dynamically scheduled sidelink transmission, one of the set 1 and the set 2 can be selected based on the quantity of sidelink information bits after multiplexing. For example, if the quantity of sidelink information bits after multiplexing is within the interval 2, the set 2 is selected for reporting.

For another example, two resources can be configured for one configured sidelink grant: a resource 1 and a resource 2, where a quantity of information bits carriable by the resource 1 is within an interval 1, and a quantity of information bits carriable by the resource 2 is within an interval 2. In this way, when the UE needs to feed back sidelink information for the sidelink transmission on the configured sidelink grant, a corresponding resource can be selected based on a size of the sidelink information. For example, if the quantity of information bits of the sidelink information that the UE needs to feed back for the sidelink transmission on the configured sidelink grant is within the interval 1, the resource 1 is selected for reporting.

Optionally, among a plurality of configured resource sets, there may be some resource sets corresponding to different transmission bit quantities or different transmission bit quantity ranges, and there may be some resource sets corresponding to a same transmission bit quantity or a same transmission bit quantity range.

For example, three resource sets can be configured for one configured sidelink grant: a set 1, a set 2, and a set 3, where a quantity of information bits carriable by all resources in the set 1 and the set 2 is within an interval 1, and a quantity of information bits carriable by all resources in the set 3 is within an interval 2.

Optionally, among a plurality of configured resources, there may be some resources corresponding to different transmission bit quantities or different transmission bit quantity ranges, and there may be some resources corresponding to a same transmission bit quantity or a same transmission bit quantity range.

For example, three resources can be configured for one configured sidelink grant: a resource 1, a resource 2, and a resource 3, where a quantity of information bits carriable by the resource 1 is within an interval 1, and a quantity of information bits carriable by the resource 2 and the resource 3 is within an interval 2.

Further, if the sidelink information is multiplexed with sidelink information of another dynamically scheduled sidelink transmission, one of the resource 1 and the resource 2 can be selected based on the quantity of sidelink information bits after multiplexing. For example, if the quantity of sidelink information bits after multiplexing is within the interval 2, the resource 2 is selected for reporting.

Optionally, in a case in which the resource is a resource of type 1, the configuring, for a first terminal, a resource for transmitting target sidelink information may include at least one of the following:
  configuring, for the first terminal, at least one resource set of type 1 for transmitting the target sidelink information; and
  configuring, for the first terminal, at least one resource of type 1 for transmitting the target sidelink information, where
  the resource of type 1 includes at least one of a physical uplink control channel PUCCH resource and a physical sidelink feedback channel PSFCH resource.

In this embodiment, in a case in which the resource for transmitting the target sidelink information is a PUCCH resource and/or a PSFCH resource, the control node may configure at least one of at least one PUCCH resource set and at least one PSFCH resource set for the first terminal, and/or at least one of at least one PUCCH resource and at least one PSFCH resource for the first terminal.

For example, a maximum of K1 PUCCH resource sets can be configured for the UE, where a PUCCH resource set L1 (or referred to as a sidelink PUCCH resource set) is used for the target sidelink information, that is, a PUCCH resource included in the PUCCH resource set L is used for the target sidelink information. Optionally, K1>4, and L1>3.

For another example, a PUCCH resource set Y1 configured for the UE includes at least one PUCCH resource, where a PUCCH resource Z1 (or referred to as a sidelink PUCCH resource) is used for the target sidelink information, other PUCCH resources are used for uplink information reporting, and Y1 and Z1 are both positive integers.

Optionally, in a case in which the resource is a resource of type 2, the configuring, for a first terminal, a resource for transmitting target sidelink information includes at least one of the following:
  configuring, for the first terminal, at least one configured grant for transmitting the target sidelink information; and
  indicating, to the first terminal by using first scheduling signaling, a fourth resource for transmitting the target sidelink information, where the fourth resource includes at least one of at least one resource set of type 2 and at least one resource of type 2, where
  the resource of type 2 includes at least one of a physical uplink shared channel PUSCH resource and a physical sidelink shared channel PSSCH resource.

In this embodiment, the configured grant may include at least one of a configured UL grant and a configured sidelink grant. The first scheduling signaling may include DCI signaling or SCI signaling. The at least one resource set of type 2 may include at least one PUSCH resource set and/or at least one PSSCH resource set. The at least one resource of type 2 may include at least one PUSCH resource and/or at least one PSSCH resource.

In an implementation, the control node may only configure, for the first terminal, at least one configured grant for transmitting the target sidelink information.

Optionally, the control node may only indicate, to the first terminal by using the first scheduling signaling, at least one configured grant for transmitting the target sidelink information.

In another implementation, the control node may first configure, for the first terminal, at least one configured grant for transmitting the target sidelink information, and then indicate, to the first terminal by using the first scheduling signaling, the configured grant for transmitting the target sidelink information.

In another implementation, in a case in which the resource for transmitting the target sidelink information is a PUCCH resource and/or a PSFCH resource, the control node may only indicate at least one of at least one resource set of type 2 and at least one resource of type 2 to the first terminal by using the first scheduling signaling.

In another implementation, the control node may first configure, for the first terminal, at least one configured grant for transmitting the target sidelink information, and then indicate, to the first terminal by using the first scheduling signaling, the resource for transmitting the target sidelink information.

It should be noted that the control node may explicitly or implicitly indicate, to the first terminal by using the first scheduling signaling, the fourth resource for transmitting the target sidelink information. This is not limited in this embodiment.

Optionally, the control node may further configure at least one of a PUCCH resource set and a PUCCH resource used in NR for the first terminal, and the first terminal may determine, from the at least one of the PUCCH resource set and the PUCCH resource used in NR, the resource for transmitting the target sidelink information.

Optionally, the target sidelink information may be transmitted on the fourth resource in a form of a MAC (Media Access Control) CE (Control Element). In this way, even if different information is multiplexed and transmitted on the same fourth resource, there is no need to design a physical layer rule. For example, different information can be divided into different MAC CEs. For example, uplink information corresponds to a MAC CE 1, and the first sidelink information corresponds to a MAC CE 2.

Optionally, the configuring, for a first terminal, a resource for transmitting target sidelink information may include:
  indicating, to the first terminal by using second scheduling signaling, a fifth resource for transmitting the target sidelink information, where
  the second scheduling signaling is scheduling signaling used to schedule a sidelink transmission corresponding to the target sidelink information, and the fifth resource includes at least one of at least one resource set and at least one resource.

In this embodiment, the control node may explicitly or implicitly indicate, to the first terminal by using the second scheduling signaling, the fifth resource for transmitting the target sidelink information, where the second scheduling signaling may include DCI signaling or SCI signaling. Therefore, resource configuration flexibility can be improved.

Optionally, the fifth resource may include a resource determined based on a first target parameter, where
the first target parameter may include at least one of the following:
a time domain resource occupied by the second scheduling signaling;
a reference signal carried by the second scheduling signaling;
a scrambling code of the second scheduling signaling;
an identifier carried by the second scheduling signaling;
a resource of the second scheduling signaling;
a resource range of the second scheduling signaling; and
a number of the second scheduling signaling.

In this embodiment, the time domain resource occupied by the second scheduling signaling is, for example, a moment of the second scheduling signaling. Specifically, the time domain resource occupied by the second scheduling signaling may be a slot occupied by the second scheduling signaling, a time domain symbol quantity of the second scheduling signaling, a start symbol of the second scheduling signaling, or an end symbol of the second scheduling signaling.

For example, if the slot in which the second scheduling signaling is located is a slot n, even if an absolute receiving time and an absolute sending time are different, both the control node and a receive end can understand that there is scheduling signaling in the slot n.

The fifth resource may be determined based on the time domain resource occupied by the second scheduling signaling. For example, the fifth resource may be a resource closest to the moment of the second scheduling signaling, or the fifth resource may be a resource determined based on the time domain resource occupied by the second scheduling signaling and a target offset time, where the target offset time may be predefined by a protocol, configured by the control node, preconfigured, negotiated between terminals, or indicated by another terminal, and the another terminal may be a terminal other than the first terminal.

For example, the fifth resource may be a resource after a target offset time k after the moment n of the second scheduling signaling, and the first terminal may use a resource corresponding to a moment n+k to transmit the target sidelink information.

The fifth resource may be determined based on a reference signal in the second scheduling signaling, and different reference signal sequences correspond to different resources, so that the fifth resource can be determined based on the reference signal in the second scheduling signaling.

The fifth resource may be determined based on the scrambling code of the second scheduling signaling or a scrambling code of the reference signal in the second scheduling signaling, and different scrambling code sequences correspond to different resources, so that the fifth resource can be determined based on the scrambling code.

The identifier carried by the second scheduling signaling may include at least one of a terminal identifier, a group identifier, a resource identifier and a service identifier, a HARQ process identifier, a carrier identifier, a bandwidth part (BWP) identifier, a configured grant identifier, a connection identifier, a priority identifier, a resource pool identifier, a sub-channel identifier, a sidelink information feedback resource identifier, a transmission type identifier, a resource scheduling type identifier, a transmission mode identifier, a latency identifier, a ratio identifier, a position identifier, and the like.

The resource of the second scheduling signaling is, for example, a position of a control channel element (CCE) of the scheduling signaling.

The resource range of the second scheduling signaling is, for example, a control resource set (CORESET) of the second scheduling signaling.

The number of the second scheduling signaling may include a downlink assignment index (DAI) or a sidelink assignment index (SAI) of the second scheduling signaling. Optionally, at least one of a position of a CCE in the scheduling signaling and a size of the CORESET can be substituted into a preset formula to calculate a target resource.

Optionally, the DAI or the SAI can be substituted into a preset formula to calculate a target resource.

In this embodiment, the control node implicitly indicates, to the first terminal by using the second scheduling signaling, the resource for transmitting the target sidelink information. Therefore, resource overheads can be reduced.

Optionally, the second scheduling signaling may carry an identifier of the fifth resource.

In this embodiment, the control node explicitly indicates, to the first terminal by using the second scheduling signaling, at least one resource identifier and/or at least one resource set identifier used for the target sidelink information, so that the first terminal can quickly determine, based on the resource identifier, the resource for transmitting the target sidelink information.

For example, for a unicast transmission or multicast transmission, the second scheduling signaling carries a PUCCH ID, and the first terminal reports the target sidelink information based on a PUCCH corresponding to the PUCCH ID.

Optionally, the second scheduling signaling may carry identifiers of N fifth resources, and N is a quantity of receiving terminals or sending terminals.

For example, for a multicast transmission, there are N receiving UEs in a group, and the second scheduling signaling carries N PUCCH IDs. Therefore, after receiving the second scheduling signaling, receiving UE can determine a PUCCH of the UE based on an association relationship between an ID of the receiving UE and a PUCCH ID, and perform reporting by using the determined PUCCH; or after receiving the second scheduling signaling, sending UE reports, based on an association relationship between IDs of receiving UEs and PUCCH IDs, information from different receiving UEs on PUCCHs corresponding to the different receiving UEs.

Optionally, in a case in which the target sidelink information is sidelink information corresponding to a sidelink transmission corresponding to a configured sidelink grant type 2, the second scheduling signaling is activation signaling used to activate the configured sidelink grant type 2.

In this embodiment, the configured sidelink grant type 2 is the configured sidelink grant type 2.

Specifically, in the case in which the target sidelink information is the sidelink information corresponding to the sidelink transmission corresponding to the configured sidelink grant type 2, the activation signaling used to activate the configured sidelink grant type 2 may be used to indicate the resource for transmitting the target sidelink information.

For example, the control node carries a resource identifier in the scheduling signaling for activating the configured sidelink grant type 2, to instruct the first terminal to use the resource corresponding to the identifier to transmit the target sidelink information.

For another example, the control node carries a resource set identifier in the scheduling signaling for activating the configured sidelink grant type 2, to instruct the first terminal to use a resource in a resource set corresponding to the identifier to transmit the target sidelink information.

For another example, the control node carries a resource identifier and a resource set identifier in the scheduling signaling for activating the configured sidelink grant type 2, to instruct the first terminal to transmit the target sidelink information on a resource that is in a resource set corresponding to the resource set identifier and corresponds to the resource identifier.

In this embodiment, the activation signaling used to activate the configured sidelink grant type 2 is used to indicate the resource for transmitting the target sidelink information. Therefore, signaling overheads can be reduced.

An embodiment of this disclosure provides an information transmission method, applied to a first terminal. FIG. 4 is a flowchart of an information transmission method according to an embodiment of this disclosure. As shown in FIG. 4, the method includes the following steps.

Step 401: Determine a target resource for transmitting target sidelink information.

Step 402: Transmit the target sidelink information on the target resource.

The target sidelink information includes at least one of first sidelink information and second sidelink information, the first sidelink information is sidelink information corresponding to a sidelink transmission between the first terminal and a second terminal, and the second sidelink information is sidelink information corresponding to a sidelink transmission between the first terminal and a control node.

In this embodiment, the sidelink information may include at least one of HARQ-ACK information, CSI, an SR, and the like corresponding to the sidelink transmission.

Optionally, in a case in which the target sidelink information is transmitted through an uplink, the target resource may include at least one of a PUCCH resource and a PUSCH resource; or in a case in which the target sidelink information is transmitted through a sidelink, the target resource may include at least one of a PSFCH resource and a PSSCH resource.

In this embodiment, the first terminal may determine the target resource based on a resource indicated by higher layer signaling, or may determine the target resource based on a resource indicated by scheduling signaling, or may determine, from a resource indicated by higher layer signaling, the target resource based on scheduling signaling, or may determine the target resource based on a resource predefined by a protocol, preconfigured, negotiated between terminals, or indicated by another terminal, where the another terminal may be a terminal other than the first terminal.

It should be noted that the first terminal may be a sending terminal or a receiving terminal.

It should be noted that, in the case in which the target sidelink information is transmitted through the uplink, if it is determined that the first sidelink information and uplink information are multiplexed and transmitted, the target resource may be used for multiplexing and transmitting the first sidelink information and the uplink information.

In this embodiment of this disclosure, the target resource for transmitting the target sidelink information is determined; and the target sidelink information is transmitted on the target resource, where the target sidelink information includes at least one of the first sidelink information and the second sidelink information, the first sidelink information is the sidelink information corresponding to the sidelink transmission between the first terminal and the second terminal, and the second sidelink information is the sidelink information corresponding to the sidelink transmission between the first terminal and the control node. In this way, a manner of obtaining an uplink resource for transmitting sidelink information to the control node when user equipment performs a sidelink service based on a PC5 interface is provided, and further, efficiency of obtaining the resource for transmitting the target sidelink information can be improved.

Optionally, the determining a target resource for transmitting target sidelink information may include:

determining, based on obtained resource configuration information, the target resource for transmitting the target sidelink information.

In this embodiment, the resource configuration information may be predefined by a protocol, configured by the control node, preconfigured, negotiated between terminals, or indicated by another terminal, and the another terminal may be a terminal other than the first terminal.

Optionally, in a case in which the resource configuration information is configured by the control node, the resource configuration information may be configured by the control node by using higher layer signaling (for example, RRC signaling), or may be indicated by the control node by using scheduling signaling (for example, DCI signaling or SCI signaling). This is not limited in this embodiment.

In an actual application, if the resource configuration information indicates only one resource for transmitting the target sidelink information, the first terminal can transmit the target sidelink information on the resource; or if the resource configuration information indicates a plurality of resources for transmitting the target sidelink information, the first terminal may select one resource from the plurality of resources for transmitting the target sidelink information, and transmit the target sidelink information on the selected resource.

Optionally, the resource configuration information may include at least one of the following: resource information, offset information, period information, and association information.

Optionally, the resource information includes at least one of the following: at least one resource set identifier, at least one resource identifier, a quantity of bits carriable by the resource, a resource format, a frequency hopping mode, an occupied time domain resource, an occupied frequency domain resource, a time domain position, a frequency domain position, a quantity of occupied resources, a sequence, a spreading code, a cyclic shift, a start point of a time window, a period of a time window, and duration of a time window.

In this embodiment, the quantity of occupied resources may be, for example, a total quantity of occupied RBs or a total quantity of occupied REs. The cyclic shift may be, for example, an initial cyclic shift $m_0$ or a cyclic shift magnitude $m_{cs}$.

Optionally, in a case in which the transmission corresponding to the target sidelink information is associated with a time window, the target resource for transmitting the target sidelink information exists in the associated time window, that is, the target resource may be located in the time window.

Optionally, the period information may include at least one of the following:

a period of a resource set for transmitting the target sidelink information;

a period of the resource for transmitting the target sidelink information;

a ratio of a period of a resource set for transmitting the target sidelink information to a period of a configured sidelink grant;

a ratio of a period of the resource for transmitting the target sidelink information to a period of a configured sidelink grant;

a ratio of a period of a resource set for transmitting the target sidelink information to a period of a first resource; and a ratio of a period of the resource for transmitting the target sidelink information to a period of a first resource, where the first resource is a feedback resource for obtaining the target sidelink information.

In this embodiment, the first resource may include a PSFCH resource or a PSSCH resource. For example, if UE #1 sends a sidelink transmission to UE #2 and UE #3, and receives, on a PSFCH resource #2 and a PSFCH resource #3, HARQ-ACK information about the data, the PSFCH resource #2 and the PSFCH resource #3 belong to the first resource.

In an actual application, because a ratio $\alpha$ of the period of the resource and/or the resource set for transmitting the target sidelink information to the period of the configured sidelink grant is configured, the UE can determine, by using $\alpha$ and the period of the configured sidelink grant, the period of the resource and/or the resource set for transmitting the target sidelink information. Because a ratio $\beta$ of the period of the resource and/or the resource set for transmitting the target sidelink information to the period of the first resource is configured, the UE can determine, by using $\beta$ and the period of the first resource, the period of the resource and/or the resource set for transmitting the target sidelink information.

Optionally, the association information may include at least one of the following:

an association relationship between the resource for transmitting the target sidelink information and a second resource, where the second resource is a feedback resource for obtaining the target sidelink information;

an association relationship between the resource for transmitting the target sidelink information and a sidelink transmission;

an association relationship between the resource for transmitting the target sidelink information and a sending terminal; and an association relationship between the resource for transmitting the target sidelink information and a receiving terminal.

In this embodiment, the association relationship between the resource for transmitting the target sidelink information and the second resource may include at least one of the ratio of the resource for transmitting the target sidelink information and the second resource, an association relationship between an identifier of the resource for transmitting the target sidelink information and an identifier of the second resource, and the like.

The association relationship between the resource for transmitting the target sidelink information and the sidelink transmission may include at least one of a ratio of the resource for transmitting the target sidelink information to the sidelink transmission, and the like.

The association relationship between the resource for transmitting the target sidelink information and the sending terminal may include at least one of a ratio of the resource for transmitting the target sidelink information to the sending terminal, an association relationship between an identifier of the resource for transmitting the target sidelink information and an identifier of the sending terminal, and the like.

The association relationship between the resource for transmitting the target sidelink information and the receiving terminal may include at least one of a ratio of the resource for transmitting the target sidelink information to the receiving terminal, an association relationship between an identifier of the resource for transmitting the target sidelink information and an identifier of the receiving terminal, and the like.

Optionally, the association relationship between the resource for transmitting the target sidelink information and the receiving terminal may include:

an association relationship between an identifier of the resource for transmitting the target sidelink information and an identifier of the receiving terminal.

In this embodiment, a terminal identifier (such as a receiving terminal identifier) may be an ID assigned by the control node to the terminal, a terminal ID predefined by a protocol, a terminal ID preconfigured by a manufacturer, an ID generated by the terminal based on higher layer information (such as an ID of an application layer, an ID of an IP layer, or an ID of a MAC layer), an ID generated by the terminal based on some modes or rules that are configured by the control node or prescribed by a protocol or preconfigured, or a unique identifier associated with the terminal.

Optionally, the association relationship may include at least one of the following:

a ratio of the resource for transmitting the target sidelink information to a third resource, where the third resource is a feedback resource for obtaining the target sidelink information;

a ratio of the resource for transmitting the target sidelink information to a resource for a sidelink transmission;

a ratio of the resource for transmitting the target sidelink information to a sending terminal; and a ratio of the resource for transmitting the target sidelink information to a receiving terminal.

In this embodiment, the ratio may include, but is not limited to, at least one of a quantity ratio, a frequency domain density ratio, a time domain symbol ratio, and the like. The quantity ratio may be that the resource for transmitting the target sidelink information corresponds to A sidelink transmissions, the frequency domain density ratio may be that the resource for transmitting the target sidelink information corresponds to the third resource whose FDM quantity is B, and the time domain symbol ratio may be that the resource for transmitting the target sidelink information corresponds to a sidelink transmission occupying C symbols, where A, B, and C are all positive integers.

Optionally, the offset information may include an offset value between a reference point and the resource for transmitting the target sidelink information. It should be noted that the offset information may include one or more different offsets.

Optionally, the reference point may include at least one of the following: a system frame, a direct frame, and activation signaling of a configured sidelink grant type 2 corresponding to the target sidelink information, deactivation signaling of a configured sidelink grant type 2 corresponding to the target sidelink information, a configuration time of a configured sidelink grant type 1 corresponding to the target sidelink information, a configured sidelink grant corresponding to the target sidelink information, a PSFCH corresponding to the target sidelink information, a sidelink transmission corresponding to the target sidelink information, scheduling signaling, and the like, for example, a system frame number 0 (SFN 0), a direct frame number 0 (DFN 0), and a time of transmitting scheduling signaling.

Optionally, the determining, based on obtained resource configuration information, the target resource for transmitting the target sidelink information may include:

determining, based on the obtained resource configuration information and scheduling signaling, the target resource for transmitting the target sidelink information.

In this embodiment, the scheduling signaling may include DCI signaling or SCI signaling.

In an actual application, the resource configuration information may indicate a plurality of resources. The first terminal may flexibly select, from the plurality of resources based on the scheduling signaling, the target resource for transmitting the target sidelink information. Therefore, flexibility of selecting the target resource for transmitting the target sidelink information can be improved.

It should be noted that the scheduling signaling may explicitly indicate, to the first terminal, the target resource for transmitting the target sidelink information. For example, the scheduling signaling may carry an identifier of the target resource. Alternatively, the scheduling signaling may implicitly indicate, to the first terminal, the target resource for transmitting the target sidelink information.

Optionally, the target resource includes a resource selected from a sixth resource based on a second target parameter, where the sixth resource is a resource indicated by the resource configuration information, and the second target parameter includes at least one of the following:
a time domain resource occupied by the scheduling signaling;
a reference signal carried by the scheduling signaling;
an identifier carried by the scheduling signaling;
a scrambling code carried by the scheduling signaling;
a resource of the scheduling signaling;
a resource range of the scheduling signaling; and
a number of the scheduling signaling.

In this embodiment, the time domain resource occupied by the second scheduling signaling is, for example, a moment of the second scheduling signaling. Specifically, the time domain resource occupied by the second scheduling signaling may be a slot occupied by the second scheduling signaling, a time domain symbol quantity of the second scheduling signaling, a start symbol of the second scheduling signaling, or an end symbol of the second scheduling signaling.

The target resource may be determined based on the time domain resource occupied by the scheduling signaling. For example, the target resource may be a resource closest to the moment of the scheduling signaling, or the target resource may be a resource determined based on the time domain resource occupied by the scheduling signaling and a target offset time, where the target offset time may be predefined by a protocol, configured by the control node, preconfigured, negotiated between terminals, or indicated by another terminal, and the another terminal may be a terminal other than the first terminal.

For example, the target resource may be a resource after a target offset time k after the moment n of the scheduling signaling, and the first terminal may use a resource corresponding to a moment n+k to transmit the target sidelink information.

The identifier carried by the second scheduling signaling may include at least one of a terminal identifier, a group identifier, a resource identifier and a service identifier, a HARQ process identifier, a carrier identifier, a bandwidth part (BWP) identifier, a configured grant identifier, a connection identifier, a priority identifier, a resource pool identifier, a sub-channel identifier, a sidelink information feedback resource identifier, a transmission type identifier, a resource scheduling type identifier, a transmission mode identifier, a latency identifier, a ratio identifier, a position identifier, and the like.

For example, after receiving the scheduling signaling, receiving UE can determine a target PUCCH based on a correspondence between an ID of the UE and a PUCCH ID, and report the target sidelink information by using the determined target PUCCH.

For another example, after receiving the scheduling signaling, sending UE reports the target sidelink information on an indicated PUCCH based on an association relationship between an ID of receiving UE and a PUCCH ID.

The resource of the scheduling signaling is, for example, a position of a CCE of the scheduling signaling.

The resource range of the scheduling signaling is, for example, a CORESET of the scheduling signaling.

The number of the second scheduling signaling may include a DAI or a SAI of the second scheduling signaling.

Optionally, in a case in which the target sidelink information is sidelink information corresponding to a sidelink transmission corresponding to a configured sidelink grant type 2, the scheduling signaling is activation signaling used to activate the configured sidelink grant type 2.

In this embodiment, in the case in which the target sidelink information is the sidelink information corresponding to the sidelink transmission corresponding to the configured sidelink grant type 2, the activation signaling used to activate the configured sidelink grant type 2 may be used to indicate the resource for transmitting the target sidelink information.

Optionally, the target resource includes a resource selected from a seventh resource based on first information, where the seventh resource is a resource indicated by the resource configuration information, and the first information includes at least one of the following:
a data amount of the target sidelink information;
an information type of the target sidelink information;
a transmission requirement of a sidelink transmission corresponding to the target sidelink information;
quality of service QoS of a sidelink transmission corresponding to the target sidelink information;
a latency of a sidelink transmission corresponding to the target sidelink information;
a data amount of a sidelink transmission corresponding to the target sidelink information;
a priority of a sidelink transmission corresponding to the target sidelink information; and
a status of a link for transmitting the target sidelink information.

In this embodiment, the information type may include but is not limited to HARQ-ACK information, CSI, an SR, or another type. For example, if a resource 1 is selected for reporting the CSI, a resource 2 is selected for reporting the HARQ-ACK information, and a resource 3 is selected for reporting the SR.

The transmission requirement of the sidelink transmission may include at least one of a communication range, reliability, a data rate, a payload, and the like.

The QoS of the sidelink transmission may include at least one of a PC5 5G quality of service indicator (PC5 5G QoS Identifier, PQI), a PC5 flow bit rate, a PC5 link aggregated bit rate, and the like.

The target resource is determined based on the status of the link for transmitting the target sidelink information. For example, if the UE is located at an edge of a cell or quality of a Uu link is poor, long PUCCH format resources or resources which a large quantity of occupied resources are selected. For example, a plurality of RBs are occupied in frequency domain, or a total quantity of occupied REs exceeds a target preset value.

In this embodiment of this disclosure, the target resource is selected from the seventh resource based on the first information. Therefore, reliability of transmitting the target sidelink information can be improved.

Optionally, in a case in which the target sidelink information is sidelink information corresponding to a sidelink transmission corresponding to a configured sidelink grant, the target resource includes one of the following:
  M resources closest to a first reference point, where M is a positive integer;
  a resource that is offset from a second reference point by a target offset value;
  a resource whose period is the same as a period of the configured sidelink grant;
  a resource whose period is a least common multiple of a period of the configured sidelink grant; and
  a resource whose period is a greatest common divisor of a period of the configured sidelink grant.

In this embodiment, the first reference point and the second reference point may be set properly based on an actual requirement. For example, the first reference point or the second reference point may include at least one of the following: a system frame, a direct frame, and activation signaling of a configured sidelink grant type 2 corresponding to the target sidelink information, deactivation signaling of a configured sidelink grant type 2 corresponding to the target sidelink information, a configuration time of a configured sidelink grant type 1 corresponding to the target sidelink information, a configured sidelink grant corresponding to the target sidelink information, a PSFCH corresponding to the target sidelink information, a sidelink transmission corresponding to the target sidelink information, scheduling signaling, and the like,
  for example, a system frame number 0 (SFN 0), a direct frame number 0 (DFN 0), and a time of transmitting scheduling signaling.

The target offset value may be predefined by a protocol, configured by the control node, preconfigured, negotiated between terminals, or indicated by another terminal, and the another terminal may be a terminal other than the first terminal.

For example, in a case in which resource information of the resource of the configured sidelink grant is not obtained, the M resources closest to the first reference point may be considered as resources for feeding back the HARQ-ACK information for the configured sidelink grant.

For another example, in a case in which the offset information of the resource of the configured sidelink grant is not obtained, it may be considered that the offset relative to the second reference point is a fixed value, such as 0, or it is considered that a closest resource for feeding back the HARQ-ACK information for the configured sidelink grant is used for reporting. In this case, the target offset value is an offset value between the closest resource and the second reference point.

For another example, in a case in which period information of the resource of the configured sidelink grant is not obtained, it may be considered that the period of the target resource or target resource set is the same as the period of the configured sidelink grant, or it is considered that the period of the target resource or target resource set is a least common multiple of a plurality of configured periods of configured sidelink grants, or it is considered that the period of the target resource or target resource set is a greatest common divisor of a plurality of configured periods of configured sidelink grants.

It should be noted that if a plurality of configured sidelink grants are configured, the resource whose period is the same as the period of the configured sidelink grant may be a resource whose period is the same as a longest period among periods of the plurality of configured sidelink grants, or a resource whose period is the same as a shortest period among periods of the plurality of configured sidelink grants, or a resource whose period is any one of periods of the plurality of configured sidelink grants, or the like.

It should be noted that one period may include one resource or at least two resources. This is not limited in this embodiment.

Optionally, in a case in which the target sidelink information is sidelink information corresponding to a sidelink transmission corresponding to a configured sidelink grant type 1, the target resource includes one of the following:
  a resource that is offset by a first offset time from a first transmission position of a redundancy version RV 0 starting from a first target moment, where the transmission position includes at least one of a transmission occasion and a frequency domain position;
  a resource that is offset by a second offset time from a start point or an end point of an period starting from a first target moment; and
  a resource that is offset by a third offset time from a last transmission occasion of an period starting from a first target moment, where
  the first target moment is a first preset moment or a moment when the configured sidelink grant type 1 takes effect, or a moment when a first sidelink transmission is generated on the configured sidelink grant type 1, or a moment when sidelink information corresponding to a first sidelink transmission is obtained on the configured sidelink grant type 1.

The moment when the first sidelink transmission is generated on the configured sidelink grant type 1 includes a transmission occasion of the first sidelink transmission generated on the configured sidelink grant type 1, or a period of generating the first sidelink transmission on the configured sidelink grant type 1, where i is a positive integer.

In this embodiment, the configured sidelink grant type 1 is the configured sidelink grant type 1. The transmission occasion is a transmission occasion. The redundancy version is a redundancy version. The first preset moment, the first offset time, the second offset time, or the third offset time may be predefined by a protocol, configured by the control node, preconfigured, negotiated between terminals, or indicated by another terminal, and the another terminal may be a terminal other than the first terminal.

It should be noted that this embodiment is described by using an example of determining the target resource corresponding to the $i^{th}$ period. For target resources corresponding to other periods, a relative relationship between the target resource and the corresponding period is the same as a relative relationship between the $i^{th}$ period and the corresponding target resource.

For example, an end time of a period 1 is t1, and t1+K10 is a target resource 1 corresponding to a sidelink transmission in the period 1. If an end time of a subsequent period n is tn, an interval between a target resource n corresponding to a sidelink transmission in the period n and tn is also K10.

Optionally, in a case in which the target sidelink information is sidelink information corresponding to a sidelink transmission corresponding to a configured sidelink grant type 2, the target resource includes one of the following:
  a resource that is offset by a fourth offset time starting from a second target moment;
  a resource that is offset by a fifth offset time from a first transmission occasion of a redundancy version RV 0 starting from a second target moment;
  a resource that is offset by a sixth offset time from a start point or an end point of a $j^{th}$ period starting from a second target moment; and
  a resource that is offset by a seventh offset time from a last transmission position of a $j^{th}$ period starting from a second target moment, where the transmission position includes at least one of a transmission occasion and a frequency domain position, where
  the second target moment is a moment when the configured sidelink grant type 2 is activated, and j is a positive integer.

Optionally, the moment when the configured sidelink grant type 2 is activated may include a moment when the configured sidelink grant type 2 is activated recently.

It should be noted that in a case in which a plurality of configured sidelink grants type 2 are configured, the moment when the configured sidelink grant type 2 is activated may be a moment of activating any one of the plurality of configured sidelink grants type 2 recently, or may be a moment of activating a target configured sidelink grant type 2 recently among the plurality of configured sidelink grants type 2, where the target configured sidelink grant type 2 may be a grant on which a sidelink transmission occurs.

In this embodiment, the configured sidelink grant type 2 is the configured sidelink grant type 2. The fourth offset time, the fifth offset time, the sixth offset time, or the seventh offset time may be predefined by a protocol, configured by the control node, preconfigured, negotiated between terminals, or indicated by another terminal, and the another terminal may be a terminal other than the first terminal.

It should be noted that this embodiment is described by using an example of determining the target resource corresponding to the $j^{th}$ period. For target resources corresponding to other periods, a relative relationship between the target resource and the corresponding period is the same as a relative relationship between the $j^{th}$ period and the corresponding target resource.

For example, an end time of a period 1 is t1, and t1+K11 is a target resource 1 corresponding to sidelink information in the period 1. If an end time of a subsequent period n is tn, an interval between a target resource n corresponding to sidelink information in the period n and tn is also K11.

The following describes the embodiments of this disclosure in combination with examples.

Example 1: Configure a PUCCH or a PSFCH

Case 1: If the resource used for the first sidelink information (also referred to as the first sidelink information) is a PUCCH, the resource used for the target sidelink information can be configured in at least one of the following manners.

Manner 1: Configure at least one PUCCH resource set used for the first sidelink information.

For example, a maximum of five PUCCH resource sets can be configured for the UE that supports the sidelink. A fifth PUCCH resource set (or referred to as a sidelink PUCCH resource set) is used for the target sidelink information. If PUCCH resource set ID=4 is recorded as a PUCCH resource set 4, a PUCCH resource included in the PUCCH resource set is used for the target sidelink information.

Optionally, in a case in which multiplexing is allowed, the UE may further send Uu feedback information on the PUCCH resource set 4.

Optionally, the UE does not send Uu feedback information on the PUCCH resource set 4, or a configuration of the control node, or a preconfiguration, or a definition by a protocol, or scheduling ensures that a resource used for Uu feedback information does not overlap a resource in the PUCCH resource set 4.

Manner 2: Configure at least one PUCCH resource used for the first sidelink information.

For example, a configured PUCCH resource set 0 includes 32 PUCCH resources, where two PUCCH resources, such as a PUCCH resource 30 and a PUCCH resource 31 (or referred to as a sidelink PUCCH resource) are used for the first sidelink information, and a PUCCH resource 0 to a PUCCH resource 29 are used for reporting Uu feedback information.

Optionally, in a case in which multiplexing is allowed, the UE may further send Uu feedback information on the PUCCH resource 30 and/or the PUCCH resource 31.

Optionally, the UE does not send Uu feedback information on the PUCCH resource 30 and the PUCCH resource 31, or a configuration of the control node, or a preconfiguration, or a definition by a protocol, or scheduling ensures that a resource used for Uu feedback information does not overlap the PUCCH resource 30 and the PUCCH resource 31.

Manner 3: Configure a PUCCH resource set and a PUCCH resource used in NR.

In NR Release 15, a maximum of four PUCCH resource sets can be configured for the UE, each set includes a maximum of 8 or 32 PUCCH resources, and a PUCCH resource and/or a PUCCH resource set used for reporting the first sidelink information are/is allocated through a configuration of the control node, or a preconfiguration, or a definition by a protocol, or scheduling.

Optionally, a configuration of the control node, or a preconfiguration, or a definition by a protocol, or scheduling ensures that a resource used for Uu feedback information does not overlap a configured PUCCH resource used for the first sidelink information.

Optionally, in a case in which multiplexing is allowed, the UE may further send Uu feedback information on the same PUCCH resource set and/or resource.

For example, a base station sends DCI to schedule a sidelink transmission, and indicates, in the DCI, that a PUCCH resource 1 is used for reporting sidelink information corresponding to the sidelink transmission. In this case, the UE uses the PUCCH resource 1 for reporting the sidelink information corresponding to the sidelink transmission.

Optionally, the UE does not send Uu feedback information on the PUCCH resource 1, or a configuration of the control node, or a preconfiguration, or a definition by a protocol, or scheduling ensures that a resource used for Uu feedback information does not overlap the PUCCH resource 1.

In this embodiment, the PUCCH resource dedicated to reporting the sidelink information can be configured in the foregoing manner, thereby avoiding multiplexing with uplink information.

Case 2: If the resource used for the first sidelink information is a PSFCH, the resource used for the first sidelink information can be configured in at least one of the following manners.

Manner 1: Configure at least one PSFCH resource set used for the first sidelink information.

For example, if a maximum of five PSFCH resource sets can be configured for the UE that supports the sidelink, a PSFCH resource set with ID=4 (or referred to as a sidelink PSFCH resource set) is used for the target sidelink information, that is, a PSFCH resource included in the PSFCH resource set is used for the target sidelink information.

Optionally, the UE does not send the second sidelink information on the PSFCH resource set 4, or a configuration of the control node, or a preconfiguration, or a definition by a protocol, or scheduling ensures that the resource used for the second sidelink information does not overlap a resource in the PSFCH resource set 4.

Optionally, in a case in which multiplexing is allowed, the UE may further send the second sidelink information on the PSFCH resource set 4.

Manner 2: Configure at least one PSFCH resource set used for the first sidelink information.

For example, a configured PSFCH resource set 0 includes 32 PSFCH resources, where a PSFCH resource 30 and a PSFCH resource 31 (or referred to as a sidelink PSFCH resource) are used for the first sidelink information, and a PSFCH resource 0 to a PSFCH resource 29 are used for reporting the second sidelink information.

Optionally, the UE does not send the second sidelink information on the PSFCH resource 30 and the PSFCH resource 31, or a configuration of the control node, or a preconfiguration, or a definition by a protocol, or scheduling ensures that the resource used for the second sidelink information does not overlap the PSFCH resource 30 and the PSFCH resource 31.

Optionally, in a case in which multiplexing is allowed, the UE may further send the second sidelink information on the PSFCH resource 30 and/or the PSFCH resource 31.

Manner 3: Configure a PSFCH resource set and a PSFCH resource used in NR.

If a maximum of four PSFCH resource sets are configured for the UE, and each PSFCH resource set includes a maximum of 8 or 32 PSFCH resources, a configuration of the control node, or a preconfiguration, or a definition by a protocol, or scheduling ensures that the resource used for the second sidelink information does not overlap a PSFCH resource used for the first sidelink information.

For example, a base station sends DCI to schedule a sidelink transmission, and indicates, in the DCI, that a PSFCH resource 1 is used for reporting sidelink information corresponding to the sidelink transmission. In this case, the UE uses the PSFCH resource 1 for reporting the sidelink information corresponding to the sidelink transmission.

Optionally, the UE does not send the second sidelink information on the PSFCH resource 1, or a configuration of the control node, or a preconfiguration, or a definition by a protocol, or scheduling ensures that the resource used for the second sidelink information does not overlap the PSFCH resource 1.

Optionally, in a case in which multiplexing is allowed, the UE may further send the second sidelink information on the PSFCH resource 1.

In this embodiment, the PSFCH dedicated to reporting the first sidelink information can be configured in the foregoing manner to avoid multiplexing the first sidelink information with the second sidelink information.

Example 2: Configure a PUSCH or a PSSCH

Case 1: If the resource used for the sidelink information is a PUSCH, the resource used for the first sidelink information can be configured in at least one of the following manners.

Manner 1: Configure at least one configured UL grant used for the first sidelink information.

The UE may send the first sidelink information on a configured transmission occasion of the configured UL grant.

Manner 2: The scheduling signaling used to schedule the sidelink transmission carries PUSCH resource information.

The UE may send the first sidelink information on a PUSCH resource corresponding to the scheduling signaling.

In this embodiment, the PUSCH resource dedicated to reporting the first sidelink information can be configured in the foregoing manner, thereby avoiding multiplexing the sidelink information with uplink information.

Case 2: If the resource used for the first sidelink information is a PSSCH, the resource used for the first sidelink information can be configured in at least one of the following manners.

Manner 1: Configure at least one configured sidelink grant used for the first sidelink information.

The UE may send the first sidelink information on a configured transmission occasion of the configured sidelink grant.

Manner 2: The scheduling signaling used to schedule the sidelink transmission carries PSSCH resource information.

The UE may send the first sidelink information on a PSSCH resource corresponding to the scheduling signaling.

In this embodiment, the PSSCH dedicated to reporting the first sidelink information can be configured in the foregoing manner to avoid multiplexing the first sidelink information with the second sidelink information.

Optionally, if a resource is configured for the configured sidelink grant, the resource may be periodic.

Example 3: Configure and/or Indicate a Resource

Case 1: Dynamic Scheduling.

For ease of description, the following uses an example in which a radio network temporary identity (RNTI) used to scramble scheduling signaling for scheduling a sidelink transmission is referred to as an SL-RNTI for description.

Specifically, if the scheduling signaling for scheduling the sidelink transmission is scrambled by the SL-RNTI, after receiving the scheduling signaling, the UE finds that its RNTI is an SL-RNTI, and therefore knows that it is the scheduling signaling for scheduling the sidelink transmission. Based on resource allocation in the scheduling signaling, the UE performs the sidelink transmission, that is, sidelink sending or sidelink receiving.

Optionally, the scheduling signaling for scheduling the sidelink transmission includes at least one resource identifier used for the target sidelink information. In this way, after the UE obtains or determines the HARQ-ACK information for the sidelink transmission, the UE can use the resource indicated by the scheduling signaling to report the HARQ-ACK information to the control node.

Case 2: Configured Sidelink Grant Type 2.

For ease of description, the following uses an example in which an RNTI for the scheduling signaling for activating the configured sidelink grant type 2 is referred to as an SL-CG-RNTI for description.

If the scheduling signaling for activating the configured sidelink grant type 2 is scrambled by the SL-CG-RNTI, after receiving the scheduling signaling, the UE finds that its RNTI is an SL-CG-RNTI, and therefore knows that it is the scheduling signaling for activating the configured sidelink grant type 2, and activates the configured sidelink grant type 2 based on the scheduling signaling.

Further, the UE may perform a sidelink transmission on the activated configured sidelink grant type 2, that is, sidelink sending or sidelink receiving.

Optionally, the scheduling signaling for activating the configured sidelink grant type 2 may include at least one resource identifier used for the target sidelink information. In this way, after the UE uses the activated configured sidelink grant type 2 to perform the sidelink transmission, the UE can obtain or determine HARQ-ACK information for the sidelink transmission, and use the resource indicated by the scheduling signaling to report the HARQ-ACK information to the control node.

Case 3: Configure a PUCCH and Indicate a PUCCH.

The resource configuration information includes a PUCCH resource set x, including m PUCCH resources. The control node sends scheduling signaling to indicate a PUCCH resource y and instruct the UE to send sidelink information on the PUCCH resource y.

For example, for the configured sidelink grant type 2, the scheduling signaling for activating the configured sidelink grant type 2 may carry a PUCCH ID, and the UE uses a PUCCH corresponding to the PUCCH ID to report the target sidelink information.

For another example, for a multicast transmission, there are N receiving UEs in a group, and the second scheduling signaling carries a PUCCH field, where the field indicates N PUCCHs. Therefore, after receiving the second scheduling signaling, receiving UE can determine a PUCCH of the UE based on an ID of the receiving UE, and perform reporting by using the determined PUCCH; or after receiving the second scheduling signaling, sending UE reports, on an indicated PUCCH based on an ID of receiving UE, sidelink information for the receiving UE.

Optionally, the determining a PUCCH based on an ID of the receiving UE may include: determining the PUCCH based on an association relationship between the ID of the receiving UE and a PUCCH ID, or determining the PUCCH based on the ID of the receiving UE and a position corresponding to each PUCCH in the PUCCH field.

For example, for the N PUCCH IDs included in the PUCCH field carried in the second scheduling signaling, UE with a smallest UE ID corresponds to a PUCCH with a smallest ID among the N PUCCH IDs, and UE with a second smallest UE ID corresponds to a PUCCH with a second smallest ID among the N PUCCH IDs, and so on.

For example, the PUCCH field carried in the second scheduling signaling is an N-bit bitmap, each bit corresponds to one PUCCH, the UE with the smallest UE ID corresponds to a PUCCH corresponding to a first bit in the bitmap, the UE with the second smallest UE ID corresponds to a PUCCH corresponding to a second bit in the bitmap, and so on. It should be noted that in this case, the N PUCCHs in the bitmap may not be arranged in an order of ID values.

It should be noted that in a case in which the resource used for the sidelink information is a PSFCH, a manner of configuring the PSFCH and indicating the PSFCH is the same as the manner of configuring the PUCCH and indicating the PUCCH. To avoid repetition, details are not described herein again.

Case 4: Configure a PUSCH and Indicate a PUSCH.

The resource configuration information includes resource allocation for the sidelink information when the sidelink information is on the PUSCH. The resource configuration information may include m optional resource allocation schemes. The control node sends scheduling signaling to indicate a resource allocation scheme y and instruct the UE to use the resource allocation scheme y to send the target sidelink information through the PUSCH.

It should be noted that in a case in which the resource used for the sidelink information is a PSSCH, a manner of configuring the PSSCH and indicating the PSSCH is the same as the manner of configuring the PUSCH and indicating the PUSCH. To avoid repetition, details are not described herein again.

Specifically, in this embodiment, a target resource corresponding to one or more sidelink transmissions is determined through a configuration and/or an indication, that is, the sidelink information corresponding to the one or more sidelink transmissions is sent on the target resource.

For example, for a target resource at the moment n, sidelink information corresponding to a sidelink transmission between a moment n−1 and a moment n-delta is transmitted on the target resource, where 0≤delta<1.

Optionally, the plurality of sidelink transmissions may correspond to same sending UE, or the plurality of sidelink transmissions may correspond to same receiving UE; or the plurality of sidelink transmissions may correspond to same sending UE and same receiving UE.

For example, between the moment n−1 and the moment n-delta, UE 1 sends four TBs to UE 2. If the UE 2 receives and decodes the four TBs, and corresponding HARQ-ACKs are a NACK, an ACK, an ACK, and a NACK respectively, the UE 2 directly multiplexes and sends HARQ-ACK information corresponding to the four TBs on the target resource, that is, sends multiplexed information of the NACK, the ACK, the ACK, and the NACK on the target resource. Alternatively, the UE 2 sends the HARQ-ACK information corresponding to the four TBs to the UE 1, and the UE 1 multiplexes and sends the HARQ-ACK information corresponding to the four TBs on the target resource, that is, sends multiplexed information of the NACK, the ACK, the ACK, and the NACK on the target resource.

Example 4: Offset Information

The resource configuration information may include offset information, where the offset information may include one or more offset values with different meanings. Specifically, the offset information may include an offset value between a reference point and a resource (such as a resource or a resource set) for transmitting the target sidelink information.

For example, if the offset information includes a quantity of slots or a quantity of milliseconds or a quantity of frames by which a slot in which the resource for transmitting the target sidelink information is located is offset from the SFN 0, and is represented by 0, the target sidelink information may be reported by using a resource or resource set at a time t that meets a formula: (Time t−SFN 0) mod Period=0.

For example, if the offset information includes a quantity of slots or a quantity of milliseconds or a quantity of frames by which a slot in which the resource for transmitting the target sidelink information is located is offset from the DFN 0, and is represented by O, the target sidelink information may be reported by using a resource or resource set at a time t that meets a formula: (Time t−DFN 0) mod Period=0.

For another example, if the offset information includes a time difference between the resource for transmitting the target sidelink information and activation signaling of the configured sidelink grant type 2 corresponding to the resource, and is represented by K-SL-1, the UE can use a resource or resource set at a corresponding time (Time n1 of the activation signaling of the configured sidelink grant type 2+K-SL-1) to report the target sidelink information.

Optionally, for different configured sidelink grant types 2, a K-SL-1 value may be different.

For another example, if the offset information includes a time difference between the resource for transmitting the target sidelink information and a configured sidelink grant corresponding to the resource, and is represented by K-SL-2, the UE can use a resource or resource set at a corresponding time (Configured sidelink grant time n2+K-SL-2) to report the target sidelink information.

Optionally, the configured sidelink grant time n2 may be the beginning or end of every L periods, where L is a positive integer.

For another example, if the offset information includes a time difference between the resource for transmitting the target sidelink information and a PSFCH corresponding to the resource, and is represented by K-SL-3, if a time of a PSFCH for feeding back HARQ-ACK information for the sidelink transmission is n3, the UE uses a resource or resource set at a corresponding time (Time n3 of the PSFCH+K-SL-3) to report the target sidelink information.

For another example, if the offset information includes a time difference between the resource for transmitting the target sidelink information and a sidelink transmission corresponding to the resource, and is represented by K-SL-4, the UE can use a resource or resource set at a corresponding time (Time n4 of the sidelink transmission+K-SL-4) to report the target sidelink information.

Optionally, resources of a plurality of configured sidelink grants, determined based on offsets, may overlap or may be the same.

Example 5: Period Information

For related content included in the period information this embodiment, refer to the foregoing description.

Specifically, a target resource period is P0, and one target resource corresponds to a sidelink transmission position in one or more periods related to the target resource, that is, sidelink information corresponding to a plurality of sidelink transmissions can be sent on the target resource, where the sidelink transmission position may be a position actually used for the sidelink transmission, or a candidate position for the sidelink transmission (that is, a candidate occasion).

For example, the target resource period is 1 ms. For a target resource at the moment n, sidelink information corresponding to a sidelink transmission between a moment n−1 ms and a moment n-delta is transmitted on the target resource, where 0≤delta<1.

Optionally, the plurality of sidelink transmissions may correspond to same sending UE, or the plurality of sidelink transmissions may correspond to same receiving UE; or the plurality of sidelink transmissions may correspond to same sending UE and same receiving UE.

For example, between the moment n−1 and the moment n-delta, UE 1 sends four TBs to UE 2. If the UE 2 receives and decodes the four TBs, and corresponding HARQ-ACKs are a NACK, an ACK, an ACK, and a NACK respectively, the UE 2 directly multiplexes and sends HARQ-ACK information corresponding to the four TBs on the target resource, that is, sends multiplexed information of the NACK, the ACK, the ACK, and the NACK on the target resource. Alternatively, the UE 2 sends the HARQ-ACK information corresponding to the four TBs to the UE 1, and the UE 1 multiplexes and sends the HARQ-ACK information corresponding to the four TBs on the target resource, that is, sends multiplexed information of the NACK, the ACK, the ACK, and the NACK on the target resource.

For another example, a configured sidelink grant is P, and the control node configures a PUCCH resource whose period is $P*\alpha$ for reporting HARQ-ACK information corresponding to a transmission on the configured sidelink grant. If $\alpha=2$, target UE transmits a TB in a period 1 of the configured sidelink grant and receiving UE feeds back an ACK, and the target UE transmits a TB in a period 2 and the receiving UE feeds back a NACK. In this case, on a corresponding PUCCH, the target UE reports, to the control node, sidelink information corresponding to the transmissions in the two periods, that is, the NACK and the ACK, which correspond to the period 2 and the period 1 respectively, or the target UE reports an ACK and a NACK, which correspond to the period 1 and the period 2 respectively.

Example 6: Indicate a Resource by Using Activation DCI

For the configured sidelink grant, a higher-layer configuration of the configured sidelink grant includes corresponding resource configuration information.

Optionally, for the configured sidelink grant type 2, the control node may indicate, by using activation signaling, the resource for transmitting the target sidelink information.

Optionally, the activation signaling may include at least one PUCCH identifier and/or at least one resource set identifier.

For example, the base station carries a PUCCH identifier ID=0 in the DCI for activating the configured sidelink grant type 2, and the UE uses a resource corresponding to ID=0 to send the sidelink information corresponding to the configured sidelink grant type 2.

For another example, the base station carries a target resource set identifier ID=1 in the DCI for activating the configured sidelink grant type 2, and the UE uses a resource set corresponding to ID=1 to send the sidelink information corresponding to the configured sidelink grant type 2.

For another example, the base station carries a PUCCH identifier ID=1 and a resource set identifier ID=2 in the DCI for activating the configured sidelink grant type 2, and the UE uses a resource corresponding to ID=1 in a resource set corresponding to the identifier ID=2 to send the sidelink information corresponding to the configured sidelink grant type 2.

Example 7: Default Configuration

In this embodiment, in a case in which the UE does not obtain the resource configuration information, or the obtained resource configuration information does not include the following information, the UE may determine the target resource in at least one of the following manners.

Manner 1: When the resource information of the resource of the configured sidelink grant is not included, it is considered that J resources closest to the reference point are resources for feeding back the HARQ-ACL information of the configured sidelink grant.

J may be predefined by a protocol, configured by the control node, preconfigured, negotiated between terminals, or indicated by another terminal, and the another terminal may be a terminal other than the first terminal.

For example, J=1, and after the UE performs a transmission on the configured sidelink grant, a closest resource after a period of the transmission is used for reporting.

Manner 2: When the offset information of the resource of the configured sidelink grant is not included, it is considered that an offset relative to the reference point is a fixed value, such as 0, or it is considered that a closest resource for feeding back the HARQ-ACK information for the configured sidelink grant is used for reporting. In this case, the offset value is an offset value between the closest resource and the reference point.

For example, it is considered that the offset is equal to 0, and after the UE performs a transmission on the configured sidelink grant, a resource at an end moment of a period of the transmission is used for reporting.

For another example, it is considered that the offset value is equal to 0, and a resource at a moment t when (t−SFN 0) mod P=0 is satisfied is used for reporting.

For another example, it is considered that the offset value is equal to 0, and a resource at a moment t when (t−DFN 0) mod P=0 is satisfied is used for reporting.

Manner 3: When the period information of the target resource of the configured sidelink grant is not included, it is considered that the period of the target resource or target resource set is the same as the period of the configured sidelink grant, or it is considered that the period of the target resource or target resource set is a least common multiple of periods of a plurality of configured sidelink grants, or it is considered that the period of the target resource or target resource set is a greatest common divisor of periods of a plurality of configured sidelink grants.

Example 7: Send a UE Report

The control node sends scheduling signaling to UE 1, where the scheduling signaling includes resource allocation when the UE 1 performs a multicast transmission to N receiving UEs.

Optionally, if one PUCCH ID is included in the scheduling signaling, the UE 1 uses a PUCCH corresponding to the PUCCH ID to report, to the control node, HARQ-ACK information fed back by the N receiving UEs.

Optionally, if N PUCCH IDs are included in the scheduling signaling, and a PUCCH corresponding to each PUCCH ID corresponds to one receiving UE, the UE 1 may separately report, on a PUCCH corresponding to each receiving UE based on an association relationship between the PUCCH ID and the identifier of the receiving UE, HARQ-ACK information fed back by the receiving UE.

Example 8: Receive a UE Report

UE 1 performs a multicast transmission to N receiving UEs, and the control node sends scheduling signaling to the N receiving UEs, where the scheduling signaling indicates a resource for receiving the multicast transmission.

Optionally, if one PUCCH ID is included in the scheduling signaling, the N receiving UEs use a PUCCH corresponding to the PUCCH ID to report respective HARQ-ACK information to the control node.

Optionally, if the scheduling signaling includes N PUCCH IDs, a PUCCH corresponding to each PUCCH ID corresponds to one receiving UE, and the receiving UE reports HARQ-ACK information for the multicast transmission on a PUCCH corresponding to the receiving UE based on an association relationship between the PUCCH ID and the identifier of the receiving UE.

Example 9

One target resource corresponds to one resource for feeding back sidelink information corresponding to one sidelink transmission. For example, one PSFCH format 0 corresponds to one PUCCH format 0.

Optionally, the resource configuration information used to send the sidelink information includes target resource information.

Optionally, the resource configuration information includes a target resource ID, indicating that the sidelink information is sent to the control node on the target resource corresponding to the ID.

For example, the resource configuration information is configured for the sidelink transmission, and carries a target resource ID. In this case, the sidelink information corresponding to the sidelink transmission is sent to the control node on the target resource corresponding to the ID.

FIG. 5 is a structural diagram of a control node according to an embodiment of this disclosure. As shown in FIG. 5, the control node 500 includes:

a configuration module 501, configured to configure, for a first terminal, a resource for transmitting target sidelink information, where the target sidelink information includes at least one of first sidelink information and second sidelink information, the first sidelink information is sidelink information corresponding to a sidelink transmission between the first terminal and a second terminal, and the second sidelink information is sidelink information corresponding to a sidelink transmission between the first terminal and a control node.

Optionally, the configuring, for a first terminal, a resource for transmitting target sidelink information includes:

sending resource configuration information to the first terminal, where the resource configuration information is used to indicate the resource for transmitting the target sidelink information.

Optionally, the resource configuration information includes at least one of the following: resource information, offset information, period information, and association information.

Optionally, the resource information includes at least one of the following: at least one resource set identifier, at least one resource identifier, a quantity of bits carriable by the resource, a resource format, a frequency hopping mode, an occupied time domain resource, an occupied frequency domain resource, a time domain position, a frequency domain position, a quantity of occupied resources, a sequence, a spreading code, a cyclic shift, a start point of a time window, a period of a time window, and duration of a time window.

Optionally, the period information may include at least one of the following:
- a period of a resource set for transmitting the target sidelink information;
- a period of the resource for transmitting the target sidelink information;
- a ratio of a period of a resource set for transmitting the target sidelink information to a period of a configured sidelink grant;
- a ratio of a period of the resource for transmitting the target sidelink information to a period of a configured sidelink grant;
- a ratio of a period of a resource set for transmitting the target sidelink information to a period of a first resource; and
- a ratio of a period of the resource for transmitting the target sidelink information to a period of a first resource, where
- the first resource is a feedback resource for obtaining the target sidelink information.

Optionally, the association information includes at least one of the following:
- an association relationship between the resource for transmitting the target sidelink information and a second resource, where the second resource is a feedback resource for obtaining the target sidelink information;
- an association relationship between the resource for transmitting the target sidelink information and a sidelink transmission;
- an association relationship between the resource for transmitting the target sidelink information and a sending terminal; and
- an association relationship between the resource for transmitting the target sidelink information and a receiving terminal.

Optionally, the association relationship between the resource for transmitting the target sidelink information and the receiving terminal includes:
- an association relationship between an identifier of the resource for transmitting the target sidelink information and an identifier of the receiving terminal.

Optionally, the association information includes at least one of the following:
- a ratio of the resource for transmitting the target sidelink information to a third resource, where the third resource is a feedback resource for obtaining the target sidelink information;
- a ratio of the resource for transmitting the target sidelink information to a resource for a sidelink transmission;
- a ratio of the resource for transmitting the target sidelink information to a sending terminal; and
- a ratio of the resource for transmitting the target sidelink information to a receiving terminal.

Optionally, resources configured for sidelink information corresponding to different sidelink transmission types are different.

Optionally, among configured resource sets, there are at least two resource sets corresponding to different transmission bit quantities or different transmission bit quantity ranges; and/or
among configured resources, there are at least two resources corresponding to different transmission bit quantities or different transmission bit quantity ranges.

Optionally, in a case in which the resource is a resource of type 1, the configuring, for a first terminal, a resource for transmitting target sidelink information includes at least one of the following:
- configuring, for the first terminal, at least one resource set of type 1 for transmitting the target sidelink information; and
- configuring, for the first terminal, at least one resource of type 1 for transmitting the target sidelink information, where
- the resource of type 1 includes at least one of a physical uplink control channel PUCCH resource and a physical sidelink feedback channel PSFCH resource.

Optionally, in a case in which the resource is a resource of type 2, the configuration module is specifically configured to perform at least one of the following:
- configuring, for the first terminal, at least one configured grant for transmitting the target sidelink information; and
- indicating, to the first terminal by using first scheduling signaling, a fourth resource for transmitting the target sidelink information, where the fourth resource includes at least one of at least one resource set of type 2 and at least one resource of type 2, where
- the resource of type 2 includes at least one of a physical uplink shared channel PUSCH resource and a physical sidelink shared channel PSSCH resource.

Optionally, the configuration module is specifically configured to:
- indicate, to the first terminal by using second scheduling signaling, a fifth resource for transmitting the target sidelink information, where
- the second scheduling signaling is scheduling signaling used to schedule a sidelink transmission corresponding to the target sidelink information, and the fifth resource includes at least one of at least one resource set and at least one resource.

Optionally, the fifth resource includes a resource determined based on a first target parameter, where
the first target parameter includes at least one of the following:
- a time domain resource occupied by the second scheduling signaling;
- a reference signal carried by the second scheduling signaling;
- a scrambling code of the second scheduling signaling; and
- an identifier carried by the second scheduling signaling.

Optionally, the second scheduling signaling carries an identifier of the fifth resource.

Optionally, in a case in which the target sidelink information is sidelink information corresponding to a sidelink transmission corresponding to a configured sidelink grant type 2, the second scheduling signaling is activation signaling used to activate the configured sidelink grant type 2.

Optionally, the second scheduling signaling carries identifiers of N fifth resources, and N is a quantity of receiving terminals or sending terminals.

The control node 500 provided in this embodiment of this disclosure can implement each process implemented by the control node in the foregoing method embodiment. To avoid repetition, details are not described herein again.

In the control node 500 provided by this embodiment of this disclosure, the configuration module 501 is configured to configure, for the first terminal, the resource for transmitting the target sidelink information, where the target sidelink information includes at least one of the first sidelink information and the second sidelink information, the first sidelink information is the sidelink information corresponding to the sidelink transmission between the first terminal and the second terminal, and the second sidelink information is the sidelink information corresponding to the sidelink transmission between the first terminal and the control node. In this way, a manner of obtaining an uplink resource for transmitting sidelink information to the control node when user equipment performs a sidelink service based on a PC5 interface is provided, and further, efficiency of obtaining the resource for transmitting the target sidelink information can be improved.

FIG. 6 is a structural diagram of a terminal according to an embodiment of this disclosure. As shown in FIG. 6, the terminal 600 includes:

a determining module 601, configured to determine a target resource for transmitting target sidelink information; and a transmission module 602, configured to transmit the target sidelink information on the target resource, where the target sidelink information includes at least one of first sidelink information and second sidelink information, the first sidelink information is sidelink information corresponding to a sidelink transmission between the first terminal and a second terminal, and the second sidelink information is sidelink information corresponding to a sidelink transmission between the first terminal and a control node.

Optionally, the determining module is specifically configured to:

determine, based on obtained resource configuration information, the target resource for transmitting the target sidelink information.

Optionally, the resource configuration information includes at least one of the following: resource information, offset information, period information, and association information.

Optionally, the resource information includes at least one of the following: at least one resource set identifier, at least one resource identifier, a quantity of bits carriable by the resource, a resource format, a frequency hopping mode, an occupied time domain resource, an occupied frequency domain resource, a time domain position, a frequency domain position, a quantity of occupied resources, a sequence, a spreading code, a cyclic shift, a start point of a time window, a period of a time window, and duration of a time window.

Optionally, the period information may include at least one of the following:

a period of a resource set for transmitting the target sidelink information;

a period of the resource for transmitting the target sidelink information;

a ratio of a period of a resource set for transmitting the target sidelink information to a period of a configured sidelink grant;

a ratio of a period of the resource for transmitting the target sidelink information to a period of a configured sidelink grant;

a ratio of a period of a resource set for transmitting the target sidelink information to a period of a first resource; and a ratio of a period of the resource for transmitting the target sidelink information to a period of a first resource, where the first resource is a feedback resource for obtaining the target sidelink information.

Optionally, the association information includes at least one of the following:

an association relationship between the resource for transmitting the target sidelink information and a second resource, where the second resource is a feedback resource for obtaining the target sidelink information;

an association relationship between the resource for transmitting the target sidelink information and a sidelink transmission;

an association relationship between the resource for transmitting the target sidelink information and a sending terminal; and an association relationship between the resource for transmitting the target sidelink information and a receiving terminal.

Optionally, the association relationship between the resource for transmitting the target sidelink information and the receiving terminal includes:

an association relationship between an identifier of the resource for transmitting the target sidelink information and an identifier of the receiving terminal.

Optionally, the association information includes at least one of the following:

a ratio of the resource for transmitting the target sidelink information to a third resource, where the third resource is a feedback resource for obtaining the target sidelink information;

a ratio of the resource for transmitting the target sidelink information to a resource for a sidelink transmission;

a ratio of the resource for transmitting the target sidelink information to a sending terminal; and a ratio of the resource for transmitting the target sidelink information to a receiving terminal.

Optionally, the determining, based on obtained resource configuration information, the target resource for transmitting the target sidelink information includes:

determining, based on the obtained resource configuration information and scheduling signaling, the target resource for transmitting the target sidelink information.

Optionally, the target resource includes a resource selected from a sixth resource based on a second target parameter, where the sixth resource is a resource indicated by the resource configuration information, and the second target parameter includes at least one of the following:

a time domain resource occupied by the scheduling signaling;

a reference signal carried by the scheduling signaling;

an identifier carried by the scheduling signaling; and a scrambling code carried by the scheduling signaling.

Optionally, in a case in which the target sidelink information is sidelink information corresponding to a sidelink transmission corresponding to a configured sidelink grant type 2, the scheduling signaling is activation signaling used to activate the configured sidelink grant type 2.

Optionally, the target resource includes a resource selected from a seventh resource based on first information, where the seventh resource is a resource indicated by the resource configuration information, and the first information includes at least one of the following:

a data amount of the target sidelink information;

an information type of the target sidelink information;

a transmission requirement of a sidelink transmission corresponding to the target sidelink information;

quality of service QoS of a sidelink transmission corresponding to the target sidelink information;
a latency of a sidelink transmission corresponding to the target sidelink information;
a data amount of a sidelink transmission corresponding to the target sidelink information;
a priority of a sidelink transmission corresponding to the target sidelink information; and
a status of a link for transmitting the target sidelink information.

Optionally, in a case in which the target sidelink information is sidelink information corresponding to a sidelink transmission corresponding to a configured sidelink grant, the target resource includes one of the following:
M resources closest to a first reference point, where M is a positive integer;
a resource that is offset from a second reference point by a target offset value;
a resource whose period is the same as a period of the configured sidelink grant;
a resource whose period is a least common multiple of a period of the configured sidelink grant; and
a resource whose period is a greatest common divisor of a period of the configured sidelink grant.

Optionally, in a case in which the target sidelink information is sidelink information corresponding to a sidelink transmission corresponding to a configured sidelink grant type 1, the target resource includes one of the following:
a resource that is offset by a first offset time from a first transmission position of a redundancy version RV 0 starting from a first target moment, where the transmission position includes at least one of a transmission occasion and a frequency domain position;
a resource that is offset by a second offset time from a start point or an end point of an $i^{th}$ period starting from a first target moment; and
a resource that is offset by a third offset time from a last transmission occasion of an $i^{th}$ period starting from a first target moment, where
the first target moment is a first preset moment or a moment when the configured sidelink grant type 1 takes effect, and i is a positive integer.

Optionally, in a case in which the target sidelink information is sidelink information corresponding to a sidelink transmission corresponding to a configured sidelink grant type 2, the target resource includes one of the following:
a resource that is offset by a fourth offset time starting from a second target moment;
a resource that is offset by a fifth offset time from a first transmission occasion of a redundancy version RV 0 starting from a second target moment;
a resource that is offset by a sixth offset time from a start point or an end point of a $j^{th}$ period starting from a second target moment; and
a resource that is offset by a seventh offset time from a last transmission position of a $j^{th}$ period starting from a second target moment, where the transmission position includes at least one of a transmission occasion and a frequency domain position, where
the second target moment is a moment when the configured sidelink grant type 2 is activated, and j is a positive integer.

The terminal 600 provided by this embodiment of this disclosure can implement each process implemented by the terminal in the foregoing method embodiment. To avoid repetition, details are not described herein again.

In the terminal 600 provided by this embodiment of this disclosure, the determining module 601 is configured to determine the target resource for transmitting the target sidelink information; and the transmission module 602 is configured to transmit the target sidelink information on the target resource, where the target sidelink information includes at least one of the first sidelink information and the second sidelink information, the first sidelink information is the sidelink information corresponding to the sidelink transmission between the first terminal and the second terminal, and the second sidelink information is the sidelink information corresponding to the sidelink transmission between the first terminal and the control node. In this way, a manner of obtaining an uplink resource for transmitting sidelink information to the control node when user equipment performs a sidelink service based on a PC5 interface is provided, and further, efficiency of obtaining the resource for transmitting the target sidelink information can be improved.

FIG. 7 is a structural diagram of a control node according to another embodiment of this disclosure. As shown in FIG. 7, the control node 700 includes a processor 701, a memory 702, a bus interface 703, and a transceiver 704, where the processor 701, the memory 702, and the transceiver 704 are all connected to the bus interface 703.

In this embodiment of this disclosure, the control node 700 further includes a computer program stored in the memory 702 and capable of running on the processor 701. When the computer program is executed by the processor 701, each process of the foregoing resource configuration method is implemented, with the same technical effect achieved. To avoid repetition, details are not described herein again.

FIG. 8 is a structural diagram of another terminal according to an embodiment of this disclosure. Referring to FIG. 8, the terminal 800 includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art may understand that the structure of the terminal shown in FIG. 8 does not constitute a limitation on the terminal. A quantity of components included in the terminal may be greater or less than that shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

The processor 810 is configured to determine a target resource for transmitting target sidelink information; and
the radio frequency unit 801 is configured to transmit the target sidelink information on the target resource, where
the target sidelink information includes at least one of first sidelink information and second sidelink information, the first sidelink information is sidelink information corresponding to a sidelink transmission between the first terminal and a second terminal, and the second sidelink information is sidelink information corresponding to a sidelink transmission between the first terminal and a control node.

It should be understood that in this embodiment of this disclosure, the radio frequency unit 801 may be configured to receive and send signals in an information reception or transmission or call process. Specifically, after receiving downlink data from the base station, the radio frequency unit

801 sends the downlink data to the processor 810 for processing, and in addition, sends uplink data to the base station. Generally, the radio frequency unit 801 includes but is not limited to an antenna, at least one amplifier, a transceiver, a coupler, a low noise amplifier, a duplexer, and the like. In addition, the radio frequency unit 801 may further communicate with a network and another device through a wireless communications system.

The terminal provides wireless broadband Internet access for a user by using the network module 802, for example, helps the user send and receive e-mails, browse web pages, and access streaming media.

The audio output unit 803 may convert audio data received by the radio frequency unit 801 or the network module 802 or stored in the memory 809 into an audio signal, and output the audio signal as a sound. In addition, the audio output unit 803 may also provide an audio output (for example, a call signal received sound or a message received sound) related to a specific function performed by the terminal 800. The audio output unit 803 includes a speaker, a buzzer, a telephone receiver, and the like.

The input unit 804 is configured to receive an audio or video signal. The input unit 804 may include a graphics processing unit (GPU) 8041 and a microphone 8042. The graphics processing unit 8041 processes image data of a still picture or a video obtained by an image capture apparatus (for example, a camera) in an image capture mode or a video capture mode. A processed image frame may be displayed on the display unit 806. An image frame processed by the graphics processing unit 8041 may be stored in the memory 809 (or another storage medium) or sent by the radio frequency unit 801 or the network module 802. The microphone 8042 can receive a sound and can process the sound into audio data. The processed audio data can be converted into a format output that can be sent to a mobile communication base station through the radio frequency unit 801 in a telephone call mode.

The terminal 800 further includes at least one sensor 805, for example, an optical sensor, a motion sensor, and other sensors. Specifically, the optical sensor includes an ambient light sensor and a proximity sensor. The ambient light sensor may adjust luminance of a display panel 8061 based on brightness of ambient light. The proximity sensor may turn off the display panel 8061 and/or backlight when the terminal 800 moves to an ear. As a type of motion sensor, an accelerometer sensor can detect magnitudes of accelerations in all directions (usually three axes), can detect a magnitude and a direction of gravity when the terminal is in a stationary state, and can be applied to terminal posture recognition (such as screen switching between portrait and landscape, related games, and magnetometer posture calibration), functions related to vibration recognition (such as pedometer and tapping), and the like. The sensor 805 may also include a fingerprint sensor, a pressure sensor, an iris sensor, a molecular sensor, a gyroscope, a barometer, a hygrometer, a thermometer, an infrared sensor, and the like. Details are not described herein.

The display unit 806 is configured to display information input by the user or information provided for the user. The display unit 806 may include the display panel 8061. The display panel 8061 may be configured in a form of a liquid crystal display (LCD), an organic light-emitting diode (OLED), or the like.

The user input unit 807 may be configured to receive input digit or character information, and generate key signal input related to user setting and function control of the terminal. Specifically, the user input unit 807 includes a touch panel 8071 and other input devices 8072. The touch panel 8071, also referred to as a touchscreen, may capture a touch operation performed by the user on or near the touch panel (for example, an operation performed by the user on the touch panel 8071 or near the touch panel 8071 by using any appropriate object or accessory such as a finger or a stylus). The touch panel 8071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 810, and receives and executes a command sent by the processor 810. In addition, the touch panel 8071 may be implemented in a plurality of forms, for example, a resistive, capacitive, infrared, or surface acoustic wave touch panel. The user input unit 807 may further include the other input devices 8072 in addition to the touch panel 8071. Specifically, the other input devices 8072 may include but are not limited to a physical keyboard, a function key (such as a volume control key or a power on/off key), a trackball, a mouse, a joystick, and the like. Details are not described herein.

Further, the touch panel 8071 may cover the display panel 8061. After the touch panel 8071 detects a touch operation on or near the touch panel, the touch panel 8071 transmits the touch operation to the processor 810 to determine a type of a touch event. Then the processor 810 provides a corresponding visual output on the display panel 8061 based on the type of the touch event. Although the touch panel 8071 and the display panel 8061 are used as two independent components to implement input and output functions of the terminal in FIG. 8, the touch panel 8071 and the display panel 8061 may be integrated to implement the input and output functions of the terminal in some embodiments. This is not specifically limited herein.

The interface unit 808 is an interface for connecting an external apparatus to the terminal 800. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 808 may be configured to receive an input (for example, data information or power) from an external apparatus, and transmit the received input to one or more components in the terminal 800, or may be configured to transmit data between the terminal 800 and an external apparatus.

The memory 809 may be configured to store a software program and various data. The memory 809 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 809 may include a high-speed random access memory, or may include a non-volatile memory, for example, at least one magnetic disk storage device, a flash memory, or other non-volatile solid-state storage devices.

The processor 810 is a control center of the terminal. The processor 810 uses various interfaces and lines to connect all parts of the entire terminal, and performs various functions and data processing of the terminal by running or executing the software program and/or module stored in the memory 809 and invoking data stored in the memory 809, thereby performing overall monitoring on the terminal. The processor 810 may include one or more processing units. Optionally, the processor 810 may integrate an application processor and a modem processor. The application processor mainly processes the operating system, a user interface, an application program, and the like. The modem processor mainly processes wireless communication. It may be understood that the modem processor may alternatively not be integrated into the processor 810.

The terminal 800 may further include the power supply 811 (such as a battery) supplying power to each component. Optionally, the power supply 811 may be logically connected to the processor 810 by using a power management system, so that functions such as charge and discharge management and power consumption management are implemented by using the power management system.

In addition, the terminal 800 includes some functional modules that are not illustrated. Details are not described herein.

Optionally, an embodiment of this disclosure further provides a terminal, including a processor 810, a memory 809, and a computer program stored in the memory 809 and capable of running on the processor 810. When the computer program is executed by the processor 810, each process of the foregoing information transmission method embodiment is implemented, with the same technical effect achieved. To avoid repetition, details are not described herein again.

An embodiment of this disclosure further provides a computer-readable storage medium, where a computer program is stored in the computer-readable storage medium. When the computer program is executed by a processor, each process of the foregoing resource configuration method embodiment or information transmission method embodiment is implemented, with the same technical effect achieved. To avoid repetition, details are not described herein again. The computer-readable storage medium is, for example, a read-only memory (ROM), a random access memory (RAM), a magnetic disk, or an optical disc.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing embodiments, a person skilled in the art may clearly understand that the method in the foregoing embodiments may be implemented by software in addition to a necessary universal hardware platform or by hardware only. In most cases, the former is a more preferred implementation. Based on such an understanding, the technical solutions of this disclosure essentially, or the part contributing to the related art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the embodiments. The embodiments are only illustrative rather than restrictive. Inspired by this disclosure, a person of ordinary skill in the art can still derive a plurality of variations without departing from the essence of this disclosure and the protection scope of the claims. All these variations shall fall within the protection scope of this disclosure.

What is claimed is:

1. A resource configuration method, applied to a control node and comprising:
sending, to a first terminal, resource configuration information, wherein the resource configuration information indicates target resource for transmitting target sidelink information, the target resource comprises a PUCCH resource, the resource configuration information comprises offset information, the offset information indicates one or more offset values between a reference point and the target resource, and the reference point comprises a physical sidelink feedback channel (PSFCH) corresponding to the target sidelink information;
the target sidelink information comprises first sidelink information, the first sidelink information is HARQ-ACK information corresponding to a sidelink transmission between the first terminal and a second terminal; and
indicating, to the first terminal by using scheduling signaling, a resource for transmitting the target sidelink information, wherein
the scheduling signaling is used to schedule a sidelink transmission, the target sidelink information corresponds to the sidelink transmission and the indicated resource comprises at least one of at least one resource set or at least one resource.

2. The method according to claim 1, wherein the resource configuration information further comprises at least one of the following: resource information, period information, or association information.

3. The method according to claim 2, wherein the resource information comprises at least one of the following: at least one resource set identifier, at least one resource identifier, a quantity of bits carriable by the resource, a resource format, a frequency hopping mode, an occupied time domain resource, an occupied frequency domain resource, a time domain position, a frequency domain position, a quantity of occupied resources, a sequence, a spreading code, a cyclic shift, a start point of a time window, a period of a time window, or duration of a time window.

4. The method according to claim 2, wherein the period information comprises at least one of the following:
a period of a resource set for transmitting the target sidelink information;
a period of the resource for transmitting the target sidelink information;
a ratio of a period of a resource set for transmitting the target sidelink information to a period of a configured sidelink grant;
a ratio of a period of the resource for transmitting the target sidelink information to a period of a configured sidelink grant;
a ratio of a period of a resource set for transmitting the target sidelink information to a period of a first resource; or a ratio of a period of the resource for transmitting the target sidelink information to a period of a first resource;

wherein the first resource is a feedback resource for obtaining the target sidelink information.

5. The method according to claim 2, wherein the association information comprises at least one of the following:

an association relationship between the resource for transmitting the target sidelink information and a second resource, wherein the second resource is a feedback resource for obtaining the target sidelink information;

an association relationship between the resource for transmitting the target sidelink information and a sidelink transmission;

an association relationship between the resource for transmitting the target sidelink information and a sending terminal; or an association relationship between the resource for transmitting the target sidelink information and a receiving terminal;

or, the association relationship between the resource for transmitting the target sidelink information and the receiving terminal comprises:

an association relationship between an identifier of the resource for transmitting the target sidelink information and an identifier of the receiving terminal;

and/or the association relationship between the resource for transmitting the target sidelink information and the sending terminal comprises:

an association relationship between an identifier of the resource for transmitting the target sidelink information and an identifier of the sending terminal.

6. The method according to claim 5, wherein the association relationship comprises at least one of the following:

a ratio of the resource for transmitting the target sidelink information to a third resource, wherein the third resource is a feedback resource for obtaining the target sidelink information;

a ratio of the resource for transmitting the target sidelink information to a resource for a sidelink transmission;

a ratio of the resource for transmitting the target sidelink information to a sending terminal; or a ratio of the resource for transmitting the target sidelink information to a receiving terminal.

7. The method according to claim 1, wherein the indicated resource comprises a resource determined based on a first target parameter, wherein the first target parameter comprises at least one of the following:

a time domain resource occupied by the scheduling signaling;

a reference signal carried by the scheduling signaling;

a scrambling code of the scheduling signaling;

an identifier carried by the scheduling signaling;

a resource of the scheduling signaling;

a resource range of the scheduling signaling; or a number of the scheduling signaling.

8. The method according to claim 1, wherein in a case in which the target sidelink information is sidelink information corresponding to a sidelink transmission corresponding to a configured sidelink grant, the target resource comprises one of the following:

M resources closest to a first reference point, wherein M is a positive integer;

a resource that is offset from a second reference point by a target offset value;

a resource whose period is the same as a period of the configured sidelink grant;

a resource whose period is a least common multiple of a period of the configured sidelink grant; and a resource whose period is a greatest common divisor of a period of the configured sidelink grant.

9. The method according to claim 8, wherein in a case in which the target sidelink information is sidelink information corresponding to a sidelink transmission corresponding to a configured sidelink grant type 1, the target resource comprises one of the following:

a resource that is offset by a first offset time from a first transmission position of a redundancy version (RV) 0 starting from a first target moment, wherein the transmission position comprises at least one of a transmission occasion and a frequency domain position;

a resource that is offset by a second offset time from a start point or an end point of an $i^{th}$ period starting from a first target moment; or a resource that is offset by a third offset time from a last transmission occasion of an $i^{th}$ period starting from a first target moment, wherein the first target moment is a first preset moment or a moment when the configured sidelink grant type 1 takes effect, and i is a positive integer;

or, wherein in a case in which the target sidelink information is sidelink information corresponding to a sidelink transmission corresponding to a configured sidelink grant type 2, the target resource comprises one of the following:

a resource that is offset by a fourth offset time starting from a second target moment;

a resource that is offset by a fifth offset time from a first transmission occasion of a redundancy version (RV) 0 starting from a second target moment;

a resource that is offset by a sixth offset time from a start point or an end point of a $j^{th}$ period starting from a second target moment; and a resource that is offset by a seventh offset time from a last transmission position of a $j^{th}$ period starting from a second target moment, wherein the transmission position comprises at least one of a transmission occasion or a frequency domain position, wherein the second target moment is a moment when the configured sidelink grant of type 2 is activated, and j is a positive integer.

10. An information transmission method, applied to a first terminal and comprising:

determining, based on obtained resource configuration information, a target resource for transmitting target sidelink information, the target resource comprises a PUCCH resource; and transmitting the target sidelink information on the target resource, wherein the resource configuration information comprises offset information, the offset information indicates one or more offset values between a reference point and the target resource, and the reference point comprises a physical sidelink feedback channel (PSFCH) corresponding to the target sidelink information; and the target sidelink information comprises first sidelink information, the first sidelink information is HARQ-ACK information corresponding to a sidelink transmission between the first terminal and a second terminal; and the method further comprises:

receiving, from a control node by using scheduling signaling, an indication of a resource for transmitting the target sidelink information; wherein the scheduling signaling is used to schedule a sidelink transmission, the target sidelink information corresponds to the sidelink transmission, and the indicated resource comprises at least one of at least one resource set or at least one resource.

11. The method according to claim 10, wherein the resource configuration information further comprises at least one of the following: resource information, period information, or association information.

12. The method according to claim 11, wherein the resource information comprises at least one of the following: at least one resource set identifier, at least one resource identifier, a quantity of bits carriable by the resource, a resource format, a frequency hopping mode, an occupied time domain resource, an occupied frequency domain resource, a time domain position, a frequency domain position, a quantity of occupied resources, a sequence, a spreading code, a cyclic shift, a start point of a time window, a period of a time window, or duration of a time window.

13. The method according to claim 11, wherein the period information comprises at least one of the following:
- a period of a resource set for transmitting the target sidelink information;
- a period of the resource for transmitting the target sidelink information;
- a ratio of a period of a resource set for transmitting the target sidelink information to a period of a configured sidelink grant;
- a ratio of a period of the resource for transmitting the target sidelink information to a period of a configured sidelink grant;
- a ratio of a period of a resource set for transmitting the target sidelink information to a period of a first resource; or
- a ratio of a period of the resource for transmitting the target sidelink information to a period of a first resource, wherein
the first resource is a feedback resource for obtaining the target sidelink information.

14. The method according to claim 11, wherein the association information comprises at least one of the following:

an association relationship between the resource for transmitting the target sidelink information and a second resource, wherein the second resource is a feedback resource for obtaining the target sidelink information;

an association relationship between the resource for transmitting the target sidelink information and a sidelink transmission;

an association relationship between the resource for transmitting the target sidelink information and a sending terminal; or an association relationship between the resource for transmitting the target sidelink information and a receiving terminal;

or, the association relationship between the resource for transmitting the target sidelink information and the receiving terminal comprises:

an association relationship between an identifier of the resource for transmitting the target sidelink information and an identifier of the receiving terminal;

and/or an association relationship between an identifier of the resource for transmitting the target sidelink information and an identifier of the sending terminal.

15. The method according to claim 14, wherein the association relationship comprises at least one of the following:

a ratio of the resource for transmitting the target sidelink information to a third resource, wherein the third resource is a feedback resource for obtaining the target sidelink information;

a ratio of the resource for transmitting the target sidelink information to a resource for a sidelink transmission;

a ratio of the resource for transmitting the target sidelink information to a sending terminal; or a ratio of the resource for transmitting the target sidelink information to a receiving terminal.

16. The method according to claim 10, wherein in a case in which the target sidelink information is sidelink information corresponding to a sidelink transmission corresponding to a configured sidelink grant, the target resource comprises one of the following:

M resources closest to a first reference point, wherein M is a positive integer;

a resource that is offset from a second reference point by a target offset value;

a resource whose period is the same as a period of the configured sidelink grant;

a resource whose period is a least common multiple of a period of the configured sidelink grant; and a resource whose period is a greatest common divisor of a period of the configured sidelink grant.

17. The method according to claim 16, wherein in a case in which the target sidelink information is sidelink information corresponding to a sidelink transmission corresponding to a configured sidelink grant type 1, the target resource comprises one of the following:

a resource that is offset by a first offset time from a first transmission position of a redundancy version (RV) 0 starting from a first target moment, wherein the transmission position comprises at least one of a transmission occasion and a frequency domain position;

a resource that is offset by a second offset time from a start point or an end point of an $i^{th}$ period starting from a first target moment; or a resource that is offset by a third offset time from a last transmission occasion of an $i^{th}$ period starting from a first target moment, wherein the first target moment is a first preset moment or a moment when the configured sidelink grant type 1 takes effect, and i is a positive integer;

or, wherein in a case in which the target sidelink information is sidelink information corresponding to a sidelink transmission corresponding to a configured sidelink grant type 2, the target resource comprises one of the following:

a resource that is offset by a fourth offset time starting from a second target moment;

a resource that is offset by a fifth offset time from a first transmission occasion of a redundancy version (RV) 0 starting from a second target moment;

a resource that is offset by a sixth offset time from a start point or an end point of a $j^{th}$ period starting from a second target moment; and a resource that is offset by a seventh offset time from a last transmission position of a $j^{th}$ period starting from a second target moment, wherein the transmission position comprises at least one of a transmission occasion or a frequency domain position, wherein the second target moment is a moment when the configured sidelink grant of type 2 is activated, and j is a positive integer.

18. A terminal, comprising a processor, a memory, and a computer program stored in the memory and capable of running on the processor, wherein when the computer program is executed by the processor, to cause the terminal to implement:

determining, based on obtained resource configuration information, a target resource for transmitting target sidelink information, the target resource comprises a PUCCH resource; and transmitting the target sidelink information on the target resource, wherein the resource configuration information comprises offset information, the offset information indicates one or more offset values between a reference point and the target resource, and the reference point comprises a physical sidelink feedback channel (PSFCH) corresponding to the target sidelink information; and the target sidelink information comprises first sidelink information, the first sidelink information is HARQ-ACK information corresponding to a sidelink transmission between the first terminal and a second terminal-; and cause the terminal to further implement:

receiving, from a control node by using scheduling signaling, an indication of a resource for transmitting the target sidelink information; wherein the scheduling signaling is used to schedule a sidelink transmission, the target sidelink information corresponds to the sidelink transmission, and the indicated resource comprises at least one of at least one resource set or at least one resource.

19. The terminal according to claim 18, wherein the resource configuration information further comprises at least one of the following: resource information, period information, or association information.

20. The terminal according to claim 18, wherein in a case in which the target sidelink information is sidelink information corresponding to a sidelink transmission corresponding to a configured sidelink grant, the target resource comprises one of the following:

M resources closest to a first reference point, wherein M is a positive integer;

a resource that is offset from a second reference point by a target offset value;

a resource whose period is the same as a period of the configured sidelink grant;

a resource whose period is a least common multiple of a period of the configured sidelink grant; and a resource whose period is a greatest common divisor of a period of the configured sidelink grant.

* * * * *